United States Patent
Yasugi et al.

(10) Patent No.: US 9,515,486 B2
(45) Date of Patent: Dec. 6, 2016

(54) OUTPUT CONTROL DEVICE AND OUTPUT CONTROL METHOD FOR WIND FARM

(71) Applicant: Mitsubishi Heavy Industries, Ltd., Tokyo (JP)

(72) Inventors: Akira Yasugi, Tokyo (JP); Tsutomu Kii, Tokyo (JP); Mitsuya Baba, Tokyo (JP); Yoshiaki Hori, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 844 days.

(21) Appl. No.: 13/902,181

(22) Filed: May 24, 2013

(65) Prior Publication Data
US 2014/0152105 A1 Jun. 5, 2014

Related U.S. Application Data

(63) Continuation of application No. PCT/JP2012/081090, filed on Nov. 30, 2012.

(51) Int. Cl.
*H02J 3/00* (2006.01)
*F03D 7/02* (2006.01)
*F03D 7/04* (2006.01)
*H02J 3/38* (2006.01)
*H02J 3/48* (2006.01)

(52) U.S. Cl.
CPC ............. *H02J 3/00* (2013.01); *F03D 7/028* (2013.01); *F03D 7/048* (2013.01);
(Continued)

(58) Field of Classification Search
CPC ........... H02J 3/00; F03D 7/028; F03D 7/048
USPC .................................. 307/52, 84
See application file for complete search history.

(56) References Cited

U.S. PATENT DOCUMENTS 7,298,059 B2 11/2007 Delmerico et al.
7,649,282 B2 1/2010 Jurkat et al.
(Continued)

FOREIGN PATENT DOCUMENTS

EP 1672778 A2 6/2006
JP 2006-226189 A 8/2006
(Continued)

OTHER PUBLICATIONS

Europe Patent Office, "Search Report for EP 12881137.9," Oct. 3, 2014.
(Continued)

*Primary Examiner* — Joseph Chang
(74) *Attorney, Agent, or Firm* — Manabu Kanesaka; Benjamin Hauptman; Kenneth Berner

(57) ABSTRACT

An output control device for a wind farm which includes n number of wind turbines includes a WTG output obtaining unit for obtaining a current output $P_i$ of each of the wind turbines; an extractable output calculation unit for calculating an extractable output $Pmax_i$ for each of the wind turbines; a potential output calculation unit for calculating a potential output $Ppot_i$ of each of the wind turbines based on a difference between the extractable output $Pmax_i$ and the current output $P_i$ of each of the wind turbines; and a WTG output determination unit for determining an output command value of each of the wind turbines so that a total output $P_{WF}$ of the wind farm becomes closer to an output target value $P_{WF}^*$. The WTG output determination unit assigns an output increase amount to each of the wind turbines and to determine the output command value.

9 Claims, 14 Drawing Sheets

(52) U.S. Cl.
CPC ......... *F05B 2270/309* (2013.01); *H02J 3/386* (2013.01); *H02J 3/48* (2013.01); *Y02E 10/723* (2013.01); *Y02E 10/763* (2013.01); *Y10T 307/549* (2015.04)

(56) References Cited

U.S. PATENT DOCUMENTS

| | | | |
|---|---|---|---|
| 8,718,832 | B2 | 5/2014 | Hashimoto et al. |
| 2009/0033096 | A1 | 2/2009 | Jurkat |
| 2009/0146423 | A1 | 6/2009 | Arinaga |
| 2010/0250012 | A1* | 9/2010 | Arinaga .................. F03D 7/028 700/287 |
| 2011/0046803 | A1 | 2/2011 | Kondo et al. |
| 2012/0104755 | A1 | 5/2012 | Hashimoto et al. |

FOREIGN PATENT DOCUMENTS

| | | |
|---|---|---|
| JP | 2007-032488 A | 2/2007 |
| JP | 2010-148336 A | 7/2010 |
| JP | 2012-097596 A | 5/2012 |

OTHER PUBLICATIONS

PCT, "International Search Report and Written Opinion for PCT/JP2012/081090" Mar. 5, 2013.
PCT/IB/338, "Notification of Transmittal of Translation of the International Preliminary Report on Patentability for International Application No. PCT/JP2012/081090," Jun. 11, 2015.
PCT/IB/373, "International Preliminary Report on Patentability for International Application No. PCT/JP2012/081090," Jun. 2, 2015.
PCT/ISA/237, "Written Opinion of the International Searching Authority for International Application No. PCT/JP2012/081090," Mar. 5, 2013.
PCT/IB/326, "Notification Concerning Transmittal of International Preliminary Report on Patentability for International Application No. PCT/JP2012/081090," Jun. 11, 2015.
PCT, "Written Opinion of the International Searching Authority for PCT/JP2012/081090," Sep. 26, 2014.
Japan Patent Office, "Decision to grant a patent for JP 2014-504886," Feb. 20, 2015.
Europe Patent Office, "Decision to Grant a Patent for European Patent Application No. 12881137.9," Mar. 17, 2016.

* cited by examiner

OUTPUT CONTROL DEVICE AND OUTPUT CONTROL METHOD FOR WIND FARM

RELATED APPLICATIONS

The present application is a PCT BY-pass continuation application based onPCT/JP2012/081090 filed Nov. 30, 2012, the disclosure of which is hereby incorporated by reference herein in its entirety.

TECHNICAL FIELD

The present invention relates to an output control device and an output control method for controlling an output of a wind farm.

BACKGROUND ART

In recent years, from the perspective of environmental preservation, wind farms formed by a group of wind turbine generators which generates power using wind power are becoming popular.

A wind farm is often connected to the grid. In this case, electric power generated in the wind farm is supplied to the grid. The wind farm connected to the grid is required to operate at an appropriate output so as not to disturb the grid stability. Thus, the output of the wind farm is controlled in some cases to achieve a desired output which is specified from the grid side.

For instance, described in Patent Literature 1 is a wind farm control device which is configured to obtain active power to be outputted from the wind farm based on a measurement value at a connection point of the wind farm to the grid and to supply a control signal to each wind turbine based on an external control signal from operators of electric utility.

Although not directly related to the output control for the wind farm, disclosed in Patent Literature 2 is a method for determining a control reserve of each wind turbine by determining a maximum value of the electric variable from the actual value of the wind and subtracting a current value of the electric variable from the maximum value of the electric variable.

Further, a particular output control method is disclosed in Patent Literature 3. According to the method, an operation for limiting the power generation output of the wind farm in advance during the normal operation (a deload operation) is performed, in order to secure electrical output from the wind farm to the grid during gird disturbance.

CITATION LIST

Patent Literature

[PTL 1]
U.S. Pat. No. 7,649,282
[PTL 2]
US2009/0033096
[PTL 3]
JP 2012-97596 A

SUMMARY

Technical Problem

The inventors of the present invention originally thought of a technique to assign an output change amount of a difference between the power generation output of the wind farm and an output target value to each wind turbine according to a current output of each wind turbine, as one technique to bring the actual output of the entire wind farm to the output target value.

However, with this method, in the case where the wind speed of each wind turbine changes after the output change amount is specified for each of the wind turbines, there is a possibility that the output of the entire wind farm cannot be obtained as planned for the following reasons. Specifically, for a wind turbine whose wind speed has increased after the output change amount is assigned, the wind turbine has potential to further increase the output but the power generation output is restricted by the assigned output change amount. In contrast, for a wind turbine whose wind speed has decreased after the output change amount is assigned, there is a chance that the wind turbine fails to achieve the assigned output change amount due to the wind speed reduction. Thus, there is a chance that the actual output of the entire wind farm falls below the output target value.

In this perspective, Patent Literatures 1 to 3 do not disclose a method for appropriately controlling the output of the entire wind farm to the target output.

It is an object of at least one embodiment of the present invention to provide an output control device and an output control method for a wind farm, which is extremely capable of matching the output of the entire wind farm to the target output.

Solution to Problem

An output control device according to at least one of the present invention is for a wind farm which includes n number of wind turbines, n being an integer of two or more, and comprises:

a WTG output obtaining unit for obtaining a current output $P_i$ of each of the wind turbines where $i=1, \ldots, n$;

an extractable output calculation unit for calculating an extractable output $Pmax_i$ for each of the wind turbines where $i=1, \ldots, n$, the extractable output $Pmax_i$ being energy extractable from wind energy;

a potential output calculation unit for calculating a potential output $Ppot_i$ of each of the wind turbines based on a difference between the extractable output $Pmax_i$ and the current output $P_i$ of each of the wind turbines where $i=1, \ldots, n$; and a WTG output determination unit for determining an output command value of each of the wind turbines so that a total output $P_{WF}$ of the wind farm becomes closer to an output target value $P_{WF}^*$, wherein the WTG output determination unit is configured to assign an output increase amount to each of the wind turbines based on the potential output $Ppot_i$ of each of the wind turbines and to determine the output command value based on the output increase amount, when the output target value $P_{WF}^*$ of the wind farm is greater than the total output $P_{WF}$ of the wind farm.

In the above output control device for the wind farm, when the output target value $P_{WF}^*$ is greater than the total output $P_{WF}$ of the wind farm, the output increase amount is assigned to each of the wind turbines based on the potential output $Ppot_i$ of each of the wind turbines. Thus, it is possible to mitigate inequality between the WF output $P_{WF}$ and the output target value $P_{WF}^*$ which results from wind speed decline. More specifically, by taking into account the potential output $Ppot_i$, which is excess of the extractable output $Pmax_i$ with respect to the current output $P_i$, when assigning the output increase amount to each of the wind turbines, it is possible to reduce effects that the wind speed decrease of some of the wind turbines has on the total output $P_{WF}$ of the wind farm.

In some embodiments, the WTG output determination unit is configured to assign the output increase amount only to those wind turbines whose potential output $Ppot_i$ is greater than a threshold value $Ppot_{th}$ where $Ppot_{th} \geq 0$.

As a result, even if the wind speed decreases for some of the wind turbines, it is still possible to achieve the WF output $P_{WF}$ of the wind farm, which is close to the output target value $P_{WF}^*$. This can be achieved by not assigning the output increase amount to those wind turbines whose potential output $Ppot_i$ is zero or almost zero and whose output increase cannot be expected much at the present moment, and assigning the output increase amount only to those wind turbines whose potential output $Ppot_i$ is greater than the threshold value $Ppot_{th}$ and whose output increase can be expected at the present moment.

Further, in another embodiment, when the threshold value $Ppot_{th}$ is zero, whether or not the potential output $Ppot_i$ is greater than zero which is as the threshold value $Ppot_{th}$ is determined based on whether or not the rotor rotation speed of the wind turbine has reached the rated rotation speed. More specifically, a wind turbine whose rotor rotation speed has reached the rated rotation speed is treated as a wind turbine whose potential output $Ppot_i$ is greater than zero and the WTG output determination unit assigns the output increase amount to this wind turbine. In contrast, a wind turbine whose rotor rotation speed has not reached the rated rotation speed is treated as a wind turbine whose potential output $Ppot_i$ is zero and the WTG output determination unit does not assign the output increase amount to this wind turbine.

In some embodiments, the WTG output determination unit is configured to obtain the output command value for each of the wind turbines so that the output increase amount of each of the wind turbines is proportional to an amount of the potential output $Ppot_i$.

As a result, even if the wind speed decreases for some of the wind turbines, it is still possible to achieve the WF output $P_{WF}$ of the wind farm as a whole, which is close to the output target value $P_{WF}^*$. This is possible because the greater output rise can be expected at the present moment, the greater output increase amount is assigned to the wind turbine.

In some embodiments, the output control device may further comprises a WTG output correction unit for correcting the output command value so that a sum of differences between the total output $P_{WF}$ and the output target value $P_{WF}^*$ is at least partially compensated.

As a result, it is possible to bring the average WF output $P_{WF\_ave}$ of the prescribed period closer to the output target value $P_{WF}^*$ by at least partially compensating for the sum of differences between the WF output $P_{WF}$ and the output target value $P_{WF}^*$. Further, by compensating for the deficiency of the WF output $P_{WF}$ with respect to the output target value $P_{WF}^*$ which results from wind speed decrease, system failure or the like regarding some of the wind turbines, it is possible to improve the total power generation amount of the wind farm as a whole.

In one embodiment, the WTG output correction unit is configured to correct the output command value only in a period excluding a transient period from a point when the output target value $P_{WF}^*$ is updated to a point when the total output $P_{WF}$ reaches an updated value of the output target value $P_{WF}^*$.

Depending on the grid to which the wind farm is connected to, it may be required to maintain an average rate of change (a ramp rate) at a constant rate in a prescribed period of the WF output. In this case, as described above, in the transient period from the point when the output target value $P_{WF}^*$ is updated to the point when the WF output $P_{WF}$ reaches the updated value of the output target value $P_{WF}^*$, correction of the output correction value is not performed by the WTG output correction unit so as to facilitate the output control by the ramp rate requested by the grid.

In another embodiment, the WTG output correction unit is configured to correct the output command value based on at least one of: the difference between the total output $P_{WF}$ and the output target value $P_{WF}^*$; a change rate of the total output $P_{WF}$ of the wind farm; a change rate of the current output $P_i$ of each of the wind turbines where $i=1, \ldots, n$; a difference between the current output $P_i$ of each of the wind turbines and a current output command value Pout; and a change rate of a wind speed for each of the wind turbines.

In some embodiments, the output control device for the wind farm further comprises an output change rate controller for controlling an output change rate of the total output $P_{WF}$ of the wind farm, and the output change rate controller is configured to: limit a change rate of the total output $P_{WF}$ of the wind farm to a first change rate in a transient period from a point when the output target value $P_{WF}^*$ is updated to a point when the total output $P_{WF}$ reaches an updated value of the output target value $P_{WF}^*$; and limit the change rate of the total output $P_{WF}$ of the wind farm to a second change rate in a period excluding the transient period, the second change rate being greater than the first change rate.

As described above, by limiting the change rate of the WF output $P_{WF}$ to the comparatively small first change rate in the transient period from the point when the output target value $P_{WF}^*$ is updated to the point when the WF output $P_{WF}$ reaches the updated value of the output target value $P_{WF}^*$, it is possible to facilitate the output control by the ramp rate requested by the grid.

Further, by limiting the change rate of the WF output $P_{WF}$ to the second change rate, which is comparatively a high rate, in the period excluding the transient period, the output control of the wind farm can promptly follow changes in the wind speed and it is possible to mitigate inequality between the WF output $P_{WF}$ and the output target value $P_{WF}^*$ which results from wind speed decrease. More specifically, at one point of time, the WF output $P_{WF}$ may be below the output target value $P_{WF}^*$ due to wind speed decrease, but when the wind speed increases immediately after that, the WF output $P_{WF}$ can be brought closer to the output target value $P_{WF}^*$ promptly by limiting the change rate of the WF output $P_{WF}$ to the second change rate which is greater than the first change rate.

An output control method according to at least one embodiment of the present invention is for a wind farm which includes n number of wind turbines, n being an integer of two or more, and comprises the steps of:

obtaining a current output $P_i$ of each of the wind turbines, where $i=1, \ldots, n$;

calculating an extractable output $Pmax_i$ for each of the wind turbines where $i=1, \ldots, n$, the extractable output $Pmax_i$ being extractable energy from wind energy;

calculating a potential output $Ppot_i$ of each of the wind turbines based on a difference between the extractable output $Pmax_i$ and the current output $P_i$ of each of the wind turbines where $i=1, \ldots, n$; and determining an output command value of each of the wind turbines so that a total output $P_{WF}$ of the wind farm becomes closer to an output target value $P_{WF}^*$, wherein, in the step of determining the output command value, when the output target value $P_{WF}^*$ of the wind farm is greater than the total output $P_{WF}$ of the wind farm, an output increase amount is assigned to each of the wind turbines based on the potential output $Ppot_i$ of each of the wind turbines and the output command value is determined based on the output increase amount.

In the above output control method for the wind farm, when the output target value $P_{WF}^*$ is greater than the total output $P_{WF}$ of the wind farm, the output increase amount is assigned to each of the wind turbines based on the potential output $Ppot_i$ of each of the wind turbines. Thus, it is possible to mitigate inequality between the WF output $P_{WF}$ and the output target value $P_{WF}^*$ which results from wind speed decline. More specifically, by taking into account the potential output $Ppot_i$, which is excess of the extractable output $Pmax_i$ with respect to the current output $P_i$, when assigning the output increase amount to each of the wind turbines, it is possible to reduce effects that the wind speed decrease of some of the wind turbines has on the total output $P_{WF}$ of the wind farm.

In some embodiments, in the step of determining the output command value, the output increase amount is assigned only to those wind turbines whose potential output $Ppot_i$ is greater than a threshold value $Ppot_{th}$ where $Ppot_{th} \geq 0$.

As a result, even if the wind speed decreases for some of the wind turbines, it is still possible to achieve the WF output $P_{WF}$ of the wind farm, which is close to the output target value $P_{WF}^*$.

In some embodiments, in the step of determining the output command value, the output command value for each of the wind turbines is determined so that the output increase amount of each of the wind turbines is proportional to an amount of the potential output $Ppot_i$.

As a result, even if the wind speed decreases for some of the wind turbines, it is still possible to achieve the WF output $P_{WF}$ of the wind farm as a whole, which is close to the output target value $P_{WF}^*$.

In some embodiments, the output control method may further comprises the step of correcting the output command value so that a sum of differences between the total output $P_{WF}$ and the output target value $P_{WF}^*$ is at least partially compensated.

As a result, it is possible to bring the average WF output $P_{WF\_ave}$ of the prescribed period closer to the output target value $P_{WF}^*$ by at least partially compensating for the sum of differences between the WF output $P_{WF}$ and the output target value $P_{WF}^*$. Further, by compensating for the deficiency of the WF output $P_{WF}$ with respect to the output target value $P_{WF}^*$ which results from wind speed decrease, system failure or the like regarding some of the wind turbines, it is possible to improve the total power generation amount of the wind farm as a whole.

In one embodiment, in the step of correcting the output the output command value, the output command value is corrected only in a period excluding a transient period from a point when the output target value $P_{WF}^*$ is updated to a point when the total output $P_{WF}$ reaches an updated value of the output target value $P_{WF}^*$.

As described above, by not correcting the output correction value in the transient period from the point when the output target value $P_{WF}^*$ is updated to the point when the WF output $P_{WF}$ reaches the updated value of the output target value $P_{WF}^*$, it is made easier to perform the output control by the ramp rate requested by the grid.

In another embodiment, in the step of correcting the output the output command value, the output command value is corrected based on at least one of: the difference between the total output $P_{WF}$ and the output target value $P_{WF}^*$; a change rate of the total output $P_{WF}$ of the wind farm; a change rate of the current output $P_i$ of each of the wind turbines where $i=1, \ldots, n$; a difference between the current output $P_i$ of each of the wind turbines and a current output command value $Pout_i$; and a change rate of a wind speed for each of the wind turbines.

In some embodiments, the output control method for the wind farm further comprises an output change rate control step of controlling an output change rate of the total output $P_{WF}$ of the wind farm, and in the output change rate control step, a change rate of the total output $P_{WF}$ of the wind farm is limited to a first change rate in a transient period from a point when the output target value $P_{WF}^*$ is updated to a point when the total output $P_{WF}$ reaches an updated value of the output target value $P_{WF}^*$; and is limited to a second change rate in a period excluding the transient period, the second change rate being greater than the first change rate.

As described above, by limiting the change rate of the WF output $P_{WF}$ to the comparatively small first change rate in the transient period from the point when the output target value $P_{WF}^*$ is updated to the point when the WF output $P_{WF}$ reaches the updated value of the output target value $P_{WF}^*$, it is possible to facilitate the output control by the ramp rate requested by the grid.

Further, by limiting the change rate of the WF output $P_{WF}$ to the second change rate, which is comparatively a high rate, in the period excluding the transient period, the output control of the wind farm can promptly follow changes in the wind speed and it is possible to mitigate inequality between the WF output $P_{WF}$ and the output target value $P_{WF}^*$ which results from wind speed decrease.

Advantageous Effects

According to at least one embodiment of the present invention, when the output target value $P_{WF}^*$ is greater than the total output $P_{WF}$ of the wind farm, the output increase amount is assigned to each of the wind turbines based on the potential output $Ppot_i$ of each of the wind turbines. Thus, it is possible to mitigate inequality between the WF output $P_{WF}$ and the output target value $P_{WF}^*$ which results from wind speed decline. More specifically, by taking into account the potential output $Ppot_i$, which is excess of the extractable output $Pmax_i$ with respect to the current output $P_i$, when assigning the output increase amount to each of the wind turbines, it is possible to reduce effects that the wind speed decrease of some of the wind turbines has on the total output $P_{WF}$ of the wind farm.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

Figure 1:
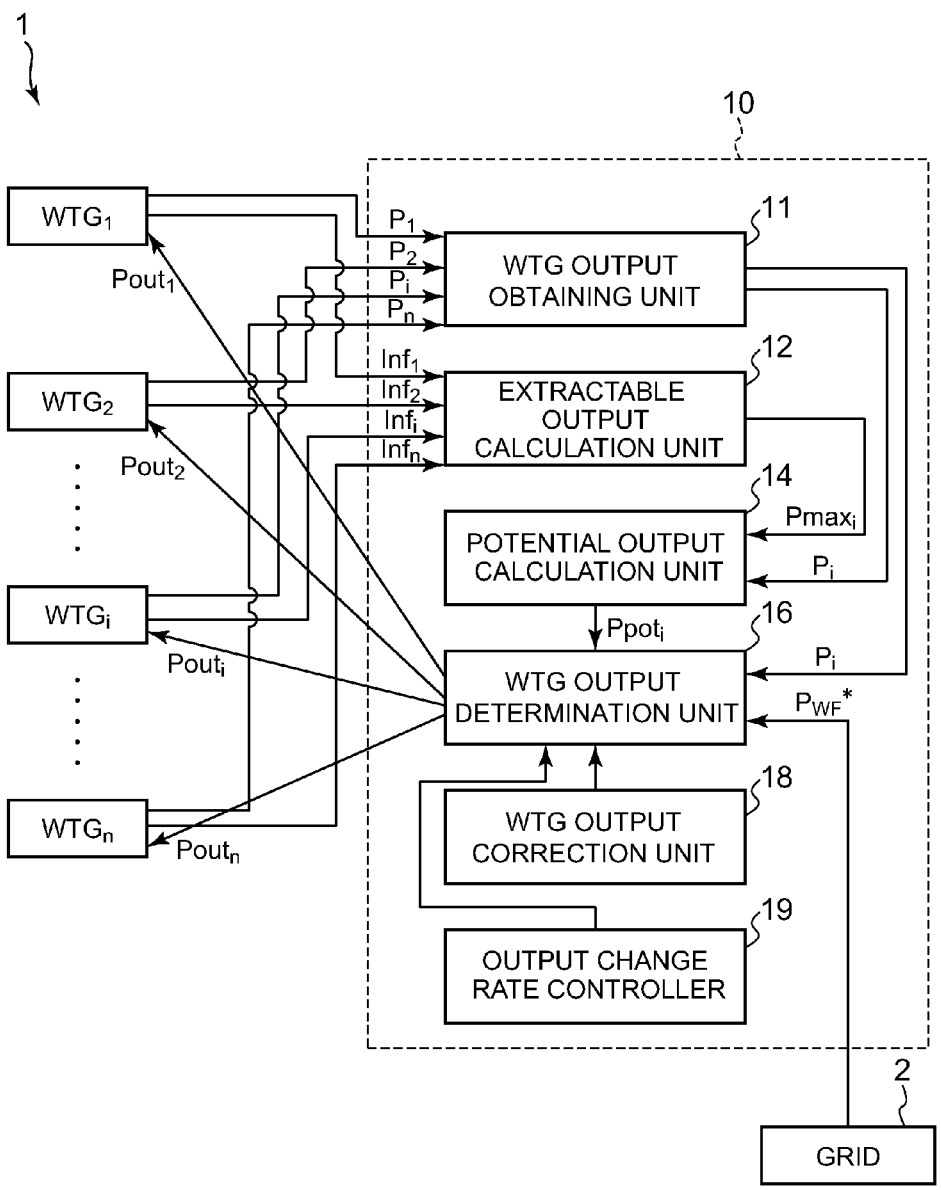
FIG. 1 is an illustration of a wind farm and a WF output control device according to an embodiment.

FIG. 1 is an illustration of a wind farm and a WF output control device according to an embodiment.

As illustrated in FIG. 1, a wind farm 1 includes n number of wind turbines $WTG_i$ (i=1, . . . , n; n being an integer of two or more). Normally, the wind farm 1 is connected to the grid. A WF output control device 10 is provided in the wind farm 1 and the WF output control device 10 is configured to control the output of the wind farm 1.

Further, in one embodiment, a centralized control (such as SCADA, Supervisory Control And Data Acquisition) governing the wind farm 1 as a whole functions as the WF output control device 10.

In some embodiments, the WF output control device 10 includes a WTG output obtaining unit 11 for obtaining a current output $P_i$ of each wind turbine $WTG_i$, an extractable output calculation unit 12 for calculating an extractable output $Pmax_i$ regarding each wind turbine $WTG_i$, a potential output calculation unit 14 for calculating a potential output $Ppot_i$ of each wind turbine $WTG_i$, and a WTG output determination unit 16 for determining an output command value of each wind turbine $WTG_i$.

The WTG output obtaining unit 11 is configured to continuously or periodically receive the current output $P_i$ of each wind turbine WTG from each wind turbine $WTG_i$. Further, the current output $P_i$ received by the WTG output obtaining unit 11 is sent to the potential output calculation unit 14 and the WTG output determination unit 16 that are described later.

The extractable output calculation unit 12 is configured to calculate extractable output $Pmax_i$ which each wind turbine $WTG_i$ can extract from wind energy. Herein, the extractable output $Pmax_i$ is the maximum value of the output that is achievable by each wind turbine $WTG_i$ at a present moment and is basically determined according to a present wind speed for each wind turbine $WTG_i$.

In some embodiments, the extractable output calculation unit 12 calculates the extractable output $Pmax_i$ for each wind turbine $WTG_i$ based on wind turbine individual information $Inf_i$ received from each wind turbine $WTG_i$. Further, the wind turbine individual information $Inf_i$ is a measurement value $V_i$ of the wind speed, a rotor rotation speed, a blade pitch angle, a current output $P_i$, etc regarding each wind turbine $WTG_i$. In one embodiment, the extractable output calculation unit 12 receives the measurement value $V_i$ of the wind speed from each wind turbine $WTG_i$ as the individual information $Inf_i$ and obtains a power curve according to the measurement value of the wind speed to calculate the extractable output $Pmax_i$. In another embodiment, the extractable output calculation unit 12 receives the rotor rotation speed, the blade pitch angle and the current output $P_i$ from each wind turbine $WTG_i$ as the individual information $Inf_i$, estimates a wind speed of each wind turbine $WTG_i$ from the individual information $Inf_i$, and obtains a power curve according to the estimated wind speed to calculate the extractable output $Pmax_i$.

The potential output calculation unit 14 calculates a potential output $Ppot_i$ for each wind turbine $WTG_i$ based on a difference between the extractable output $Pmax_i$ and the current output $P_i$ of each wind turbine $WTG_i$. Herein, the potential output $Ppot_i$ is an amount of potential output (output reserve) that each wind turbine $WTG_i$ can increase at the present moment.

In some embodiments, the potential output calculation unit 14 calculates the potential output $Ppot_i$ for each wind turbine $WTG_i$ by subtracting the current output $P_i$ of each wind turbine $WTG_i$ received from the WTG output obtaining unit 11 from the extractable output $Pmax_i$ of each wind turbine $WTG_i$ received from the extractable output calculation unit 12.

The WTG output determination unit 16 determines the output command value $Pout_i$ of each wind turbine $WTG_i$ so that the output of the wind farm 1 as a whole (the total output) $P_{WF}$ becomes closer to the output target value $P_{WF}^*$. More specifically, the WTG output determination unit 16 obtains an output change rate $s_i$ that satisfies equation 1 below and obtains the output command value $Pout_i$ (=$P_i$+$s_i$) from the output change rate $s_i$. As a result, output excess or deficiency S (=$P_{WF}$-$P_{WF}$) relative to the output target value $P_{WF}^*$ of the WF output $P_{WF}$ can be compensated by the output change rate $s_i$ of each wind turbine $WTG_i$.

$$S = \sum_{i=1}^{n} s_i \quad \text{[Equation 1]}$$

In one embodiment, the total output target value $P_{WF}^*$ of the wind farm 1 is specified from the grid 2 side where the wind farm 1 is connected.

In some embodiments, when the output target value $P_{WF}^*$ is greater than the WF output $P_{WF}$, the WTG output determination unit 16 determines the output command value Pout$_i$ of each wind turbine WTG$_i$ by assigning the output increase amount s$_i$ to each wind turbine WTG$_i$ based on the potential output Ppot$_i$ of each wind turbine WTG$_i$. More specifically, the WTG output determination unit 16 takes into account the potential output Ppot$_i$ of each wind turbine WTG$_i$ when assigning the output increase amount s$_i$ to each wind turbine WTG$_i$ in order to compensate for the deficiency S of the WF output P$_{WF}$ with respect to the output target value P$_{WF}$*.

As a result, it is possible to mitigate inequality between the WF output P$_{WF}$ and the output target value P$_{WF}$* which results from wind speed decrease. More specifically, it is possible to reduce effects that the wind speed decrease of some wind turbine WTG$_i$ has on the total output P$_{WF}$ of the wind farm 1.

In one embodiment, when compensating for the deficiency S of the WF output P$_{WF}$ with respect to the output target value P$_{WF}$*, the WTG output determination unit 16 assigns the output increase amount s$_i$ only to one or more wind turbines WTG$_i$ whose potential output Ppot$_i$ is greater than a threshold value Ppot$_{th}$ (Ppot$_{th}$≥0). More specifically, the WTG output determination unit 16 does not assign the output increase amount s$_i$ to those wind turbines whose potential output Ppot$_i$ is zero or approximately zero and whose output increase cannot be expected much at the present moment, and assigns the output increase amount s$_i$ only to those wind turbines whose potential output Ppot$_i$ is greater than the threshold value Ppot$_{th}$ and whose output increase can be expected at the present moment.

As a result, even if the wind speed decreases for some of the wind turbines WTG$_i$ it is still possible to achieve the total WF output P$_{WF}$ of the wind farm 1, which is close to the output target value P$_{WF}$*.

In one embodiment, when the threshold value Ppot$_{th}$ is zero, whether or not the potential output Ppot$_i$ is greater than the threshold value Ppot$_{th}$ is determined based on whether or not the rotor rotation speed of the wind turbine WTG$_i$ has reached a rated rotation speed.

More specifically, a wind turbine WTG$_i$ whose rotor rotation speed has reached the rated rotation speed is determined as a wind turbine whose potential output Ppot$_i$ is greater than zero and the WTG output determination unit 16 assigns the output increase amount s$_i$ to this wind turbine WTG$_i$. In contrast, a wind turbine WTG$_i$ whose rotor rotation speed has not reached the rated rotation speed is determined as a wind turbine whose potential output Ppot$_i$ is zero and the WTG output determination unit 16 does not assign the output increase amount s$_i$ to this wind turbine WTG$_i$.

Further, in another embodiment, when compensating for the deficiency S of the WF output P$_{WF}$ with respect to the output target value P$_{WF}$*, the WTG output determination unit 16 assigns the output increase amount s$_i$ to each wind turbine WTG$_i$ so that the output increase amount of each of the wind turbines is proportional to an amount of the potential output Ppot$_i$. More specifically, the WTG output determination unit 16 determines the output command value Pout$_i$ to each wind turbine WTG$_i$ so that the output increase amount s$_i$ is proportional to the amount of the potential output Ppot$_i$. In this case, the output increase amount s$_i$ that is assigned to each wind turbine WTG$_i$ satisfies the equation below.

$$s_i = a \times Ppot_i \qquad \text{[Equation 2]}$$

where coefficient a is a value that satisfies $S = \sum_{i=1}^{n} a \times Ppot_i$.

In this manner, the greater the potential output Ppot$_i$ is and the greater output rise can be expected at the present moment, the greater output increase amount s$_i$ is assigned to the wind turbine. Thus, even if the wind speed decreases for some of the wind turbines WTG$_i$, it is still possible to achieve the total WF output P$_{WF}$ of the wind farm 1, which is close to the output target value P$_{WF}$*.

In some embodiments, as illustrated in FIG. 1, the WF output control device 10 is further provided with a WTG output correction unit 18 for correcting the output command value so that a sum of differences between the WF output P$_{WF}$ and the output target value P$_{WF}$* is at least partially compensated.

Figure 2:
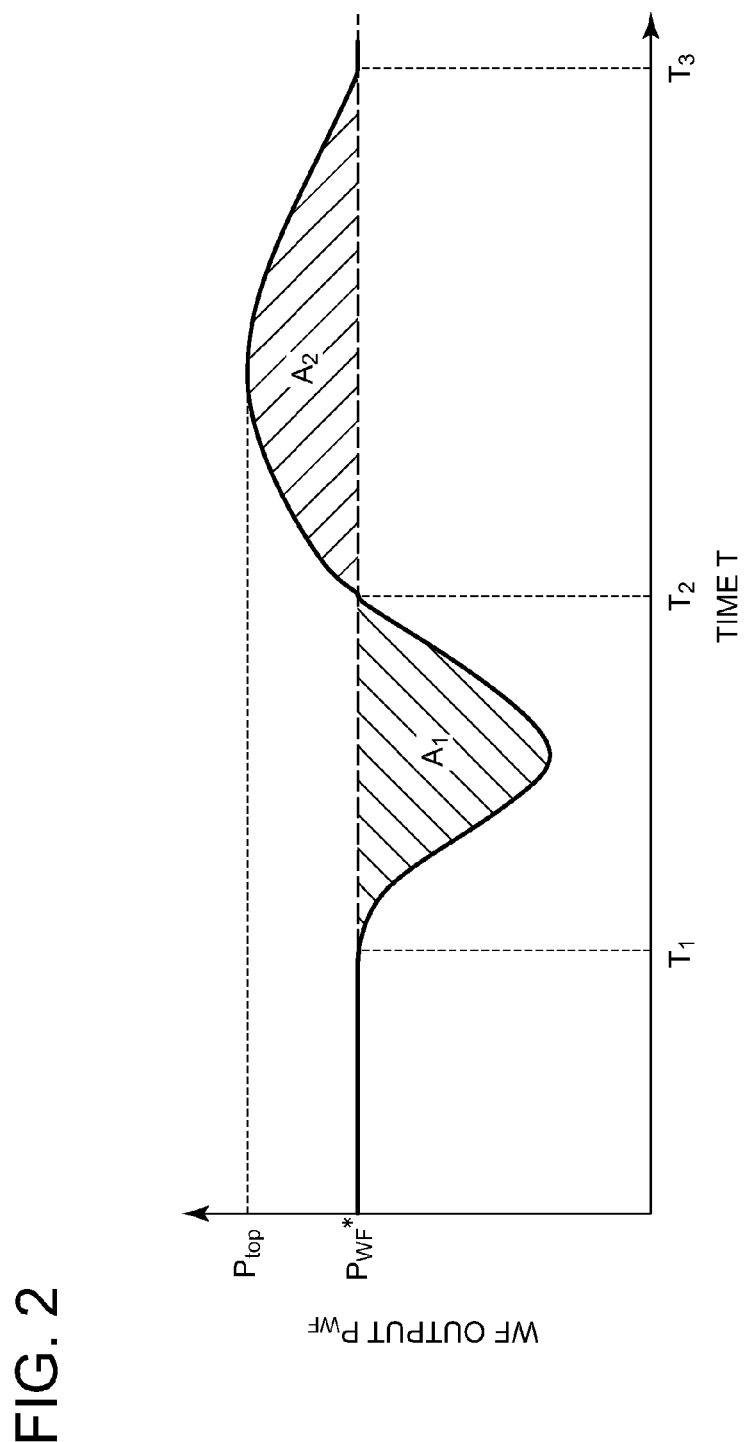
FIG. 2 is a graph illustrating a correction principle of a WTG output correction unit according to an embodiment.

FIG. 2 is a graph illustrating a correction principle of the WTG output correction unit 18 according to an embodiment. As illustrated in the drawing, in a period T$_1$-T$_2$, the WF output P$_{WF}$ is below the output target value P$_{WF}$* due to wind speed decrease, system failure, etc. for some of the wind turbines. In order to at least partially compensate for the sum of differences between the WF output P$_{WF}$ and the output target value P$_{WF}$*(area A$_1$), the WTG output correction unit 18 corrects the output command value Pout$_i$ for each wind turbine WTG$_i$. As a result, even after the WF output P$_{WF}$ recovers to the output target value P$_{WF}$* at time T$_2$ in response to wind speed increase, the WF output P$_{WF}$ continues to increase and then in a period T$_2$-T$_3$, the WF output P$_{WF}$ exceeds the output target value P$_{WF}$*. In this manner, the sum of differences between the WF output P$_{WF}$ and the output target value P$_{WF}$*(area A$_1$) in the period T$_1$-T$_2$ is at least partially compensated by a sum of differences between the WF output P$_{WF}$ and the output target value P$_{WF}$* (area A$_2$) in the period T$_2$-T$_3$.

As a result, it is possible to bring an average WF output P$_{WF\_ave}$ in a prescribed period closer to the output target value P$_{WF}$*. Further, by compensating for the deficiency S of the WF output P$_{WF}$ with respect to the output target value P$_{WF}$* (Area A$_1$) which results from wind speed decrease, system failure or the like regarding some of the wind turbines, it is possible to improve the total power generation amount of the wind farm 1 as a whole.

Further, from the perspective of preventing the WF output P$_{WF}$ from exceeding the output target value P$_{WF}$* too much, an upper limit of the WF output P$_{WF}$ is set to P$_{top}$ and excessive correction of the output command value Pout$_i$ may be suppressed by the WTG output correction unit 18. The upper limit P$_{top}$ may be, for instance, 1.05×P$_{WF}$*.

In one embodiment, the WTG output correction unit 18 corrects the output command value Pout$_i$ only in a period excluding a transient period from a point when the output target value P$_{WF}$* is updated to a point when the WF output P$_{WF}$ reaches the updated value of the output target value P$_{WF}$*.

Figure 3:
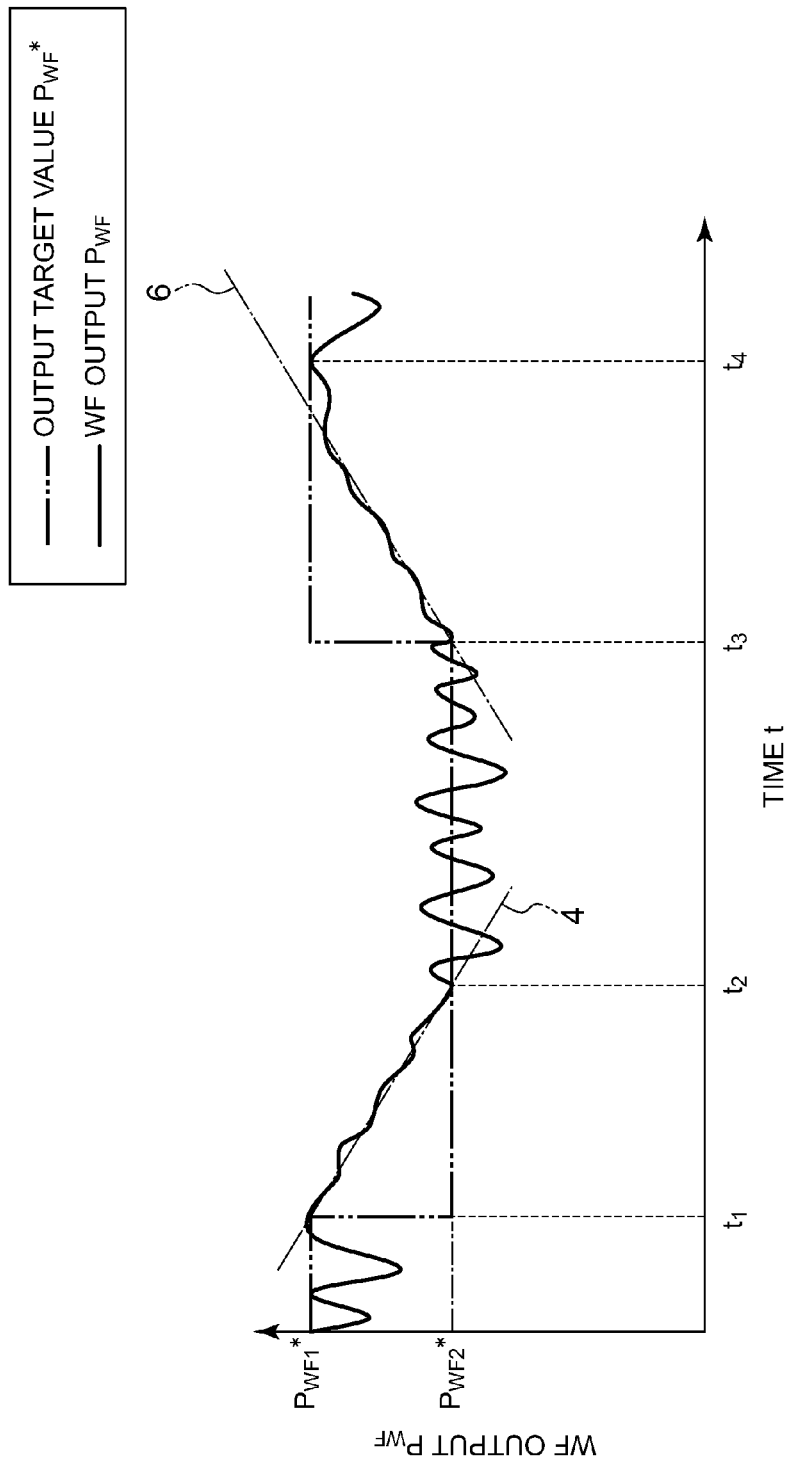
FIG. 3 is a graph illustrating changes in a WF output $P_{WF}$ before and after an output target value $P_{WF}^*$ is updated according to an embodiment.

FIG. 3 is a graph illustrating changes in a WF output P$_{WF}$ before and after the output target value P$_{WF}$* is updated according to an embodiment. In the illustrative embodiment illustrated in the drawing, the output target value P$_{WF}$* of the wind farm 1 as a whole is updated at time t$_1$ from P$_{WF1}$* to P$_{WF2}$*, and at time t$_3$, the output target value P$_{WF}$* of the wind farm 1 as a whole is updated back to P$_{WF1}$* from P$_{WF2}$*. In this case, in the transient period from the point when the output target value P$_{WF}$* is updated (time t$_1$ or t$_3$) to the point when the WF output P$_{WF}$ reaches the updated value of the output target value P$_{WF}$* (the period t$_1$-t$_2$ or the period t$_3$-t$_4$), the WTG output correction unit 18 does not correct the output command value Pout$_i$. In contrast, in the period excluding this transient period (the period of t1 and before, the period t$_2$-t$_3$, and the period from t$_4$ and after), correction of the output command value $Pout_i$ is performed by the WTG output correction unit 18.

Depending on the grid 2 that the wind farm 1 is connected to, it may be required to maintain an average rate of change (a ramp-rate) at a constant rate in a prescribed period of the WF output $P_{WF}$ (e.g. five minutes). In an illustrative embodiment illustrated in FIG. 3, straight lines 4 and 6 are ramp rates requested by the grid 2. In this case, as described above, in the transient period from the point when the output target value $P_{WF}*$ is updated (time $t_1$ or $t_3$) to the point when the WF output $P_{WF}$ reaches the updated value of the output target value $P_{WF}*$ (the period $t_1$–$t_2$ or the period $t_3$–$t_4$), the WTG output correction unit 18 does not correct the output command value $Pout_i$. In contrast, in the transient period from the point when the output target value $P_{WF}*$ is updated to the point when the WF output $P_{WF}$ reaches the updated value of the output target value $P_{WF}*$, correction of the output correction value $Pout_i$ by the WTG output correction unit 18 is not performed so as to facilitate the output control by the ramp rate requested by the grid 2.

In some embodiments, the WTG output correction unit 18 is configured to correct the output command value $Pout_i$ based on at least one of: the difference between the total output $P_{WF}$ and the output target value $P_{WF}*$; a change rate of the total output $P_{WF}$ of the wind farm; a change rate of the current output $P_i$ of each of the wind turbines; a difference between the current output $P_i$ of each of the wind turbines and a current output command value $Pout_i$; and a change rate of a wind speed for each of the wind turbines $WTG_i$.

The specific method of correcting the output command value $Pout_i$ using the WTG output correction unit 18 is described later in details.

In some embodiments, as illustrated in FIG. 1, the WF output control unit 10 is further provided with an output change rate controller 19 for controlling an output change rate of the WF output $P_{WF}$. The output change rate controller 19 limits a change rate of the WF output $P_{WF}$ to one of two change rates (a first change rate and a second change rate) depending on conditions. More specifically, in the transient period from the point when the output target value $P_{WF}*$ is updated to the point when the WF output $P_{WF}$ reaches the updated value of the output target value $P_{WF}*$, the output change rate controller 19 limit the change rate of the WF output $P_{WF}$ to the first change rate. In contrast, in the period excluding the transient period, the output change rate controller 19 limits the change rate of the total output $P_{WF}$ of the wind farm to the second change rate. In one embodiment, a ratio of the second change rate to the first change rate is at least 3 and not greater than 30, e.g. at least 5 and not greater than 15. Typically, the first change rate is 0.1 pu/min, whereas the second change rate is 1 pu/min.

As described above, by limiting the change rate of the WF output $P_{WF}$ to the first change rate, which is comparatively a small rate, in the transient period from the point when the output target value $P_{WF}*$ is updated to the point when the WF output $P_{WF}$ reaches the updated value of the output target value $P_{WF}*$, the output control by the ramp rate requested by the grid 2 is made easy.

Further, by limiting the change rate of the WF output $P_{WF}$ to the second change rate, which is comparatively a high rate, in the period excluding the transient period, the output control of the wind farm can promptly follow changes in the wind speed and it is possible to mitigate inequality between the WF output $P_{WF}$ and the output target value $P_{WF}*$ which results from wind speed decrease. More specifically, at one point of time, the WF output $P_{WF}$ may be below the output target value $P_{WF}*$ due to wind speed decrease, but once the wind speed increases immediately after that, the WF output $P_{WF}$ can be brought closer to the output target value $P_{WF}*$ promptly by limiting the change rate of the WF output $P_{WF}$ to the second change rate which is greater than the first change rate.

Figure 4:
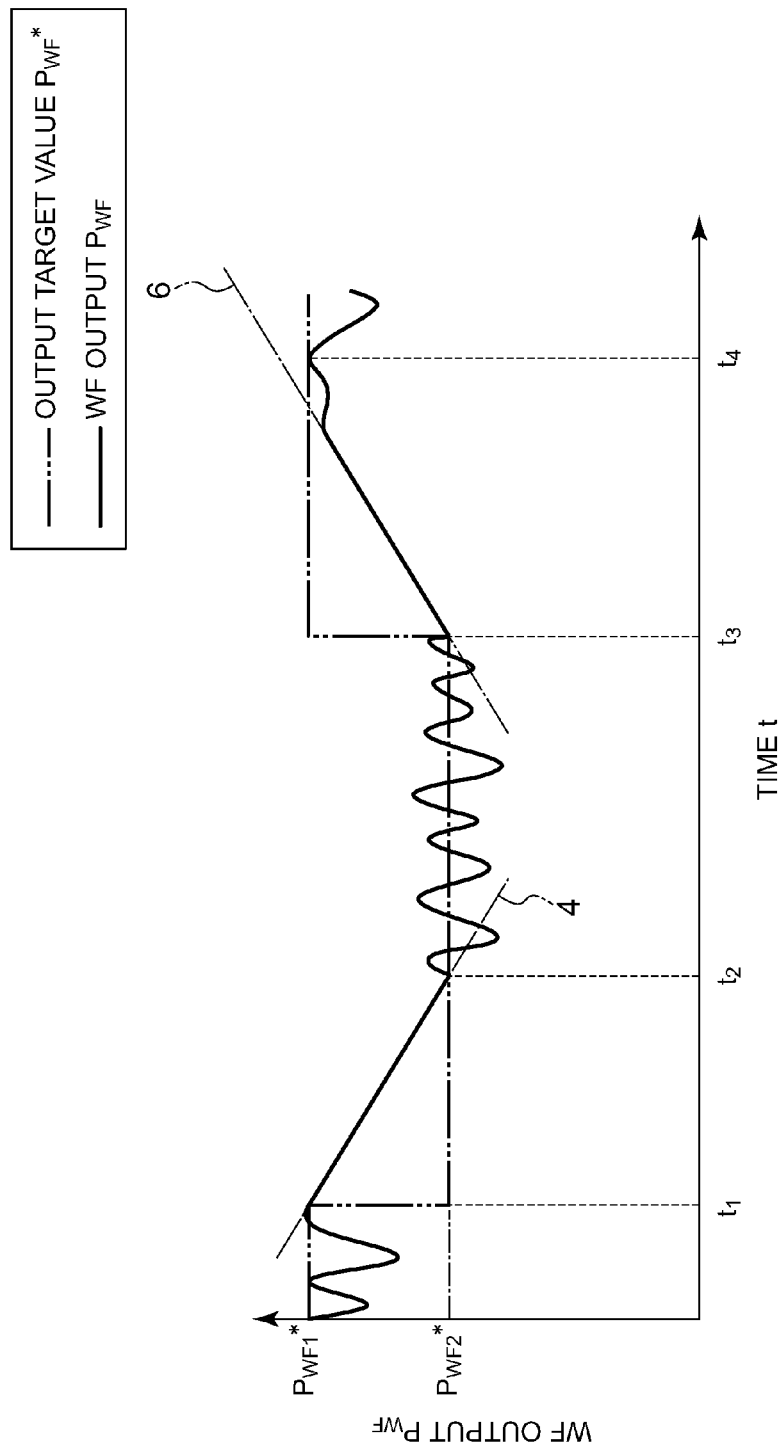
FIG. 4 is a graph illustrating changes in a WF output $P_{WF}$ before and after an output target value $P_{WF}^*$ is updated according to an embodiment.

FIG. 4 is a graph illustrating changes in the WF output $P_{WF}$ before and after the output target value $P_{WF}*$ is updated according to an embodiment. In this illustrative embodiment shown in the drawing, similarly to the embodiment shown in FIG. 3, correction of the output command value $Pout_i$ is performed by the WTG output correction unit 18 and then limitation of the change rate of the WF output $P_{WF}$ is performed by the output change rate controller 19. Further, the parameters already described in FIG. 3 are not explained further herein.

In the illustrative embodiment shown in FIG. 4, in the transient period from the point when the output target value $P_{WF}*$ is updated (time $t_1$ or $t_3$) to the point when the WF output $P_{WF}$ reaches the updated value of the output target value $P_{WF}*$ (the period $t_1$–$t_2$ or the period $t_3$–$t_4$), correction of the output command value $Pout_i$ is not performed by the WTG output correction unit 18, and the change rate of the WF output $P_{WF}$ is limited to the first change rate, which is comparatively small, by the output change rate controller 19. In contrast, in the period excluding the transient period (the period of t1 and before, the period $t_2$–$t_3$, and the period from $t_4$ and after), correction of the output command value $Pout_i$ is performed by the WTG output correction unit 18 and limitation of the change rate of the WF output $P_{WF}$ to the second change rate, which is comparatively high, by the output change rate controller 19.

As a result, as illustrated in FIG. 4, in the transient period, the average rate of change of the $P_{WF}$ in the prescribed period almost coincides with the ramp rate (lines 4 and 6 of FIG. 4) requested by the grid 2. As illustrated in FIG. 4, in the period excluding the transient period, the output control of the wind farm 1 can promptly follow changes in the wind speed and it is possible to mitigate inequality between the WF output $P_{WF}$ and the output target value $P_{WF}*$ which results from wind speed decrease.

Figure 5:
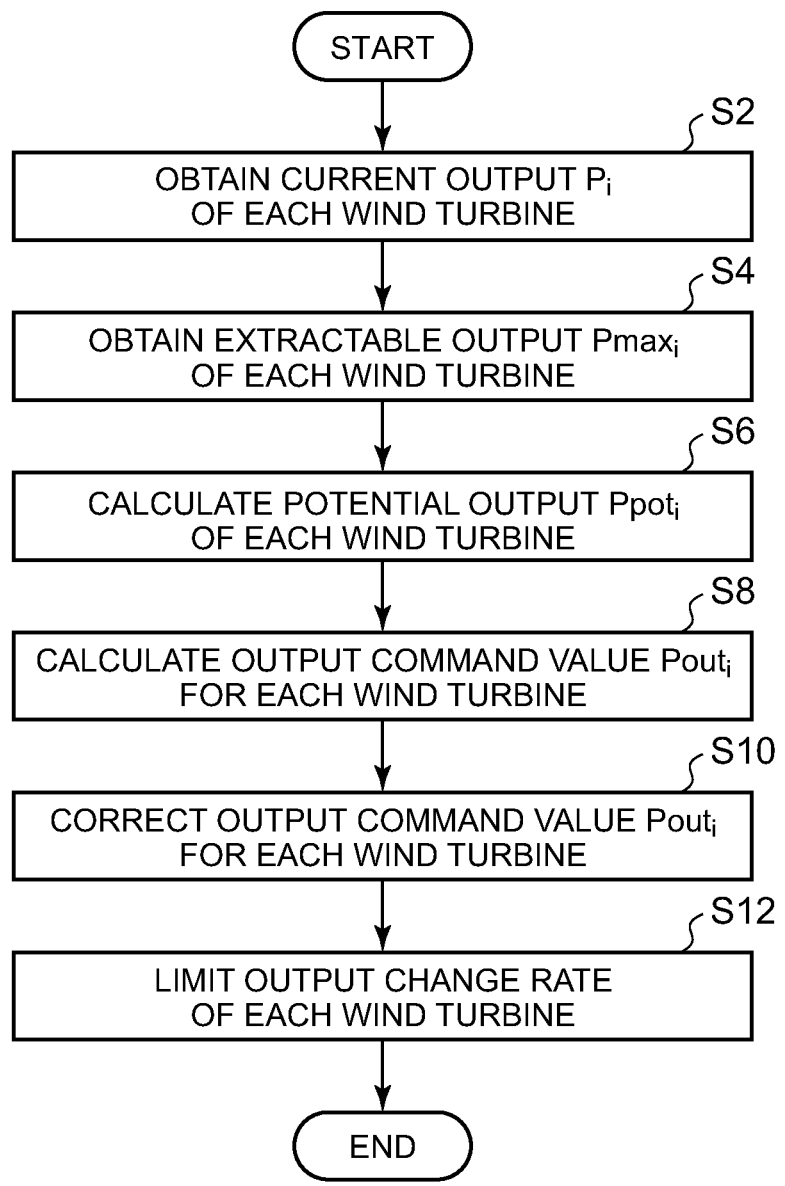
FIG. 5 is a flow chart illustrating a process of controlling output of the wind farm according to an embodiment.

Next, the output control method for the wind farm according to embodiments is explained. FIG. 5 is a flow chart illustrating a process of controlling output of the wind farm according to an embodiment.

As illustrated in the drawing, in some embodiments, the output control method includes: a WTG output obtaining step of obtaining the current output $P_i$ of each of the wind turbines (step S2); an extractable output calculation step of calculating an extractable output $Pmax_i$ for each of the wind turbines (step S4); a potential output calculation step of calculating the potential output $Ppot_i$ of each of the wind turbines (step S6); and a WTG output determination step of determining an output command value of each of the wind turbines (step S8). These steps are described below in details.

In the WTG output obtaining step (step S2), the current output $P_i$ of each wind turbine $WTG_i$ is obtained continuously or periodically from each wind turbine $WTG_i$.

In the extractable output calculation step (step S4), the extractable output $Pmax_i$ for each of the wind turbines is calculated, the extractable output $Pmax_i$ being energy extractable from wind energy.

In some embodiments, the extractable output $Pmax_i$ for each wind turbine $WTG_i$ is calculated based on wind turbine individual information $Inf_i$ received from each wind turbine $WTG_i$. Further, the wind turbine individual information $Inf_i$ is a measurement value $V_i$ of the wind speed, a rotor rotation speed, a blade pitch angle, a current output $P_i$, etc regarding each wind turbine $WTG_i$. In one embodiment, the extractable output $Pmax_i$ is calculated by obtaining the power curve according to the measurement value of the wind speed as the individual information $Inf_i$. In another embodiment, the extractable output $Pmax_i$ is calculated by obtaining the power curve according to an estimated wind speed which is estimated for each wind turbine $WTG_i$ based on the rotor rotation speed, the blade pitch angle and the current output $P_i$ as the individual information $Inf_i$.

In the potential output calculation step (step S6), the potential output $Ppot_i$ for each wind turbine $WTG_i$ is calculated based on a difference between the extractable output $Pmax_i$ and the current output $P_i$ of each wind turbine $WTG_i$.

In some embodiments, in the extractable output calculation step (step S4), the potential output $Ppot_i$ for each wind turbine $WTG_i$ is calculated by subtracting the current output $P_i$ of each wind turbine $WTG_i$ obtained in the WTG output obtaining step (step S2) from the extractable output $Pmax_i$ of each wind turbine $WTG_i$ obtained in the extractable output calculation step (step S4).

Then, in the WTG output determination step (step S8), the output command value $Pout_i$ of each wind turbine $WTG_i$ is determined so that the WF output $P_{WF}$ becomes closer to the output target value $P_{WF}^*$. More specifically, the output change rate $s_i$ of each wind turbine $WTG_i$ for compensating for the output excess or deficiency S S $(=P_{WF}^*-P_{WF})$ with respect to the output target value $P_{WF}^*$ of the WF output $P_{WF}$ is calculated and from this output change rate $s_i$, the output command value $Pout_i$ $(=P_i+s_i)$ is obtained.

Further, when assigning the output increase amount $s_i$ to each wind turbine $WTG_i$ in order to compensate for the deficiency S of the WF output $P_{WF}$ with respect to the output target value $P_{WF}^*$, the potential output $Ppot_i$ of each wind turbine $WTG_i$ may be taken into account. In one embodiment, when compensating for the deficiency S of the WF output $P_{WF}$ with respect to the output target value $P_{WF}^*$, the output increase amount $s_i$ is assigned only to one or more wind turbines $WTG_i$ whose potential output $Ppot_i$ is greater than a threshold value $Ppot_{th}$ ($Ppot_{th} \geq 0$). Herein, when the threshold value $Ppot_{th}$ is zero, whether or not the potential output $Ppot_i$ is greater than the threshold value $Ppot_{th}$ is determined based on whether or not the rotor rotation speed of the wind turbine $WTG_i$ has reached the rated rotation speed. Further, in another embodiment, when compensating for the deficiency S of the WF output $P_{WF}$ with respect to the output target value $P_{WF}^*$, the output increase amount $s_i$ is assigned to each wind turbine $WTG_i$ so that the output increase amount of each of the wind turbines is proportional to an amount of the potential output $Ppot_i$.

In some embodiments, as illustrated in FIG. 5, the output control method for the wind farm further includes a WTG output correction step (step S10) of correcting the output command value $Pout_i$ so that a sum of differences between the WF output $P_{WF}$ and the output target value $P_{WF}^*$ is at least partially compensated.

In one embodiment, in the WTG output correction step (step S10), the output command value $Pout_i$ is corrected only in the period excluding a transient period from a point when the output target value $P_{WF}^*$ is updated to a point when the WF output $P_{WF}$ reaches the updated value of the output target value $P_{WF}^*$.

Further, in the WTG output correction step (step S10), the output command value $Pout_i$ may be corrected based on at least one of: the difference between the total output $P_{WF}$ and the output target value $P_{WF}^*$ a change rate of the total output $P_{WF}$ of the wind farm; a change rate of the current output $P_i$ of each of the wind turbines; a difference between the current output $P_i$ of each of the wind turbines and a current output command value $Pout_i$; and a change rate of a wind speed for each of the wind turbines $WTG_i$.

FIG. 6 to FIG. 13 are flow charts each illustrating a process of determining a correction amount of the output command value $Pout_i$ according to an embodiment.

Figure 6:
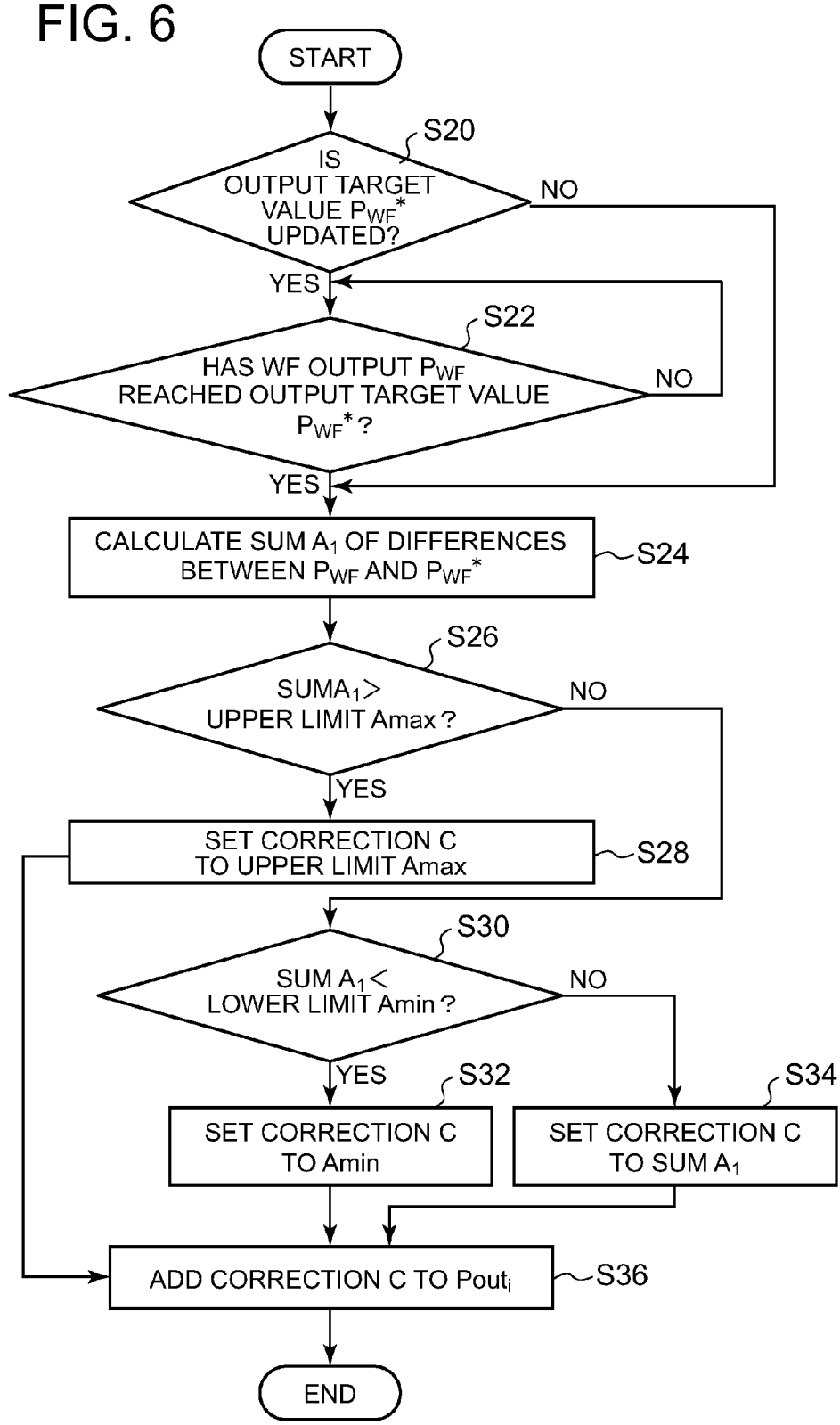
FIG. 6 is a flow chart illustrating a process of determining a correction amount of an output command value $Pout_i$ according to an embodiment.

In an illustrative embodiment shown in FIG. 6, in step S20, it is determined whether or not the output target value $P_{WF}^*$ has been updated. If the output target value $P_{WF}^*$ is updated (YES in step S20), the process advances to step S22 to determine whether or not the WF output $P_{WF}$ has reached the updated value of the output target value $P_{WF}^*$. If it is determined that the WF output $P_{WF}$ has reached the updated value of the output target value $P_{WF}^*$ (YES in step S22), the process advances to step S24 to calculate the sum $A_1$ of differences between the WF output $P_{WF}$ and the output target value $P_{WF}^*$ (see FIG. 2). In contrast, if it is determined that the WF output $P_{WF}$ has not reached the updated value of the output target value $P_{WF}^*$, the process repeats step S22. Further, if it is determined in step S20 that the output target value $P_{WF}^*$ has not been updated, the process skips step S22 and advances straight to step S24 to calculate the sum $A_1$.

After calculating the sum $A_1$, it is determined whether or not the sum $A_1$ has exceeded an upper limit $A_{max}$ which is set in advance (step S26). If it is determined that the sum $A_1$ has exceeded the upper limit $A_{max}$ (YES in step S26), the correction amount C is set to the upper limit $A_{max}$ in step S28 and the process advances to step S36 which is described later. In contrast, if the sum $A_1$ is not greater than the upper limit $A_{max}$ (No in step S26), the process advances to step S30 to determine whether or not the sum $A_1$ is below a lower limit $A_{min}$ which is set in advance. If the sum $A_1$ is below the lower limit $A_{min}$ (YES in step S30), the correction amount C is set to the lower limit $A_{min}$ in step S32 and the process advances to step S36 which is described later. In contrast, if the sum $A_1$ is not less than the lower limit $A_{min}$ (NO in step S30), the correction C is set to the sum $A_1$ in step S32 and the process advances to step S36.

In step S36, the correction amount C set in step S28, S32 or S34 is added to the output command value $Pout_i$ calculated in the above-described WTG output determination step (S8 of FIG. 5).

In this manner, the output command value $Pout_i$ is corrected using the correction amount C which is set based on the difference between the WF output $P_{WF}$ and the output target value $P_{WF}^*$.

Further, in the case where an operation period $Tcal_1$ for calculating the sum $A_1$ in step S24 is different from an operation period $Tcal_2$ for setting the correction C in step S34, a value obtained by dividing the sum $A_1$ by an operation period ratio ($=Tcal_2/Tcal_1$) may be used as the correction value C.

Figure 7:
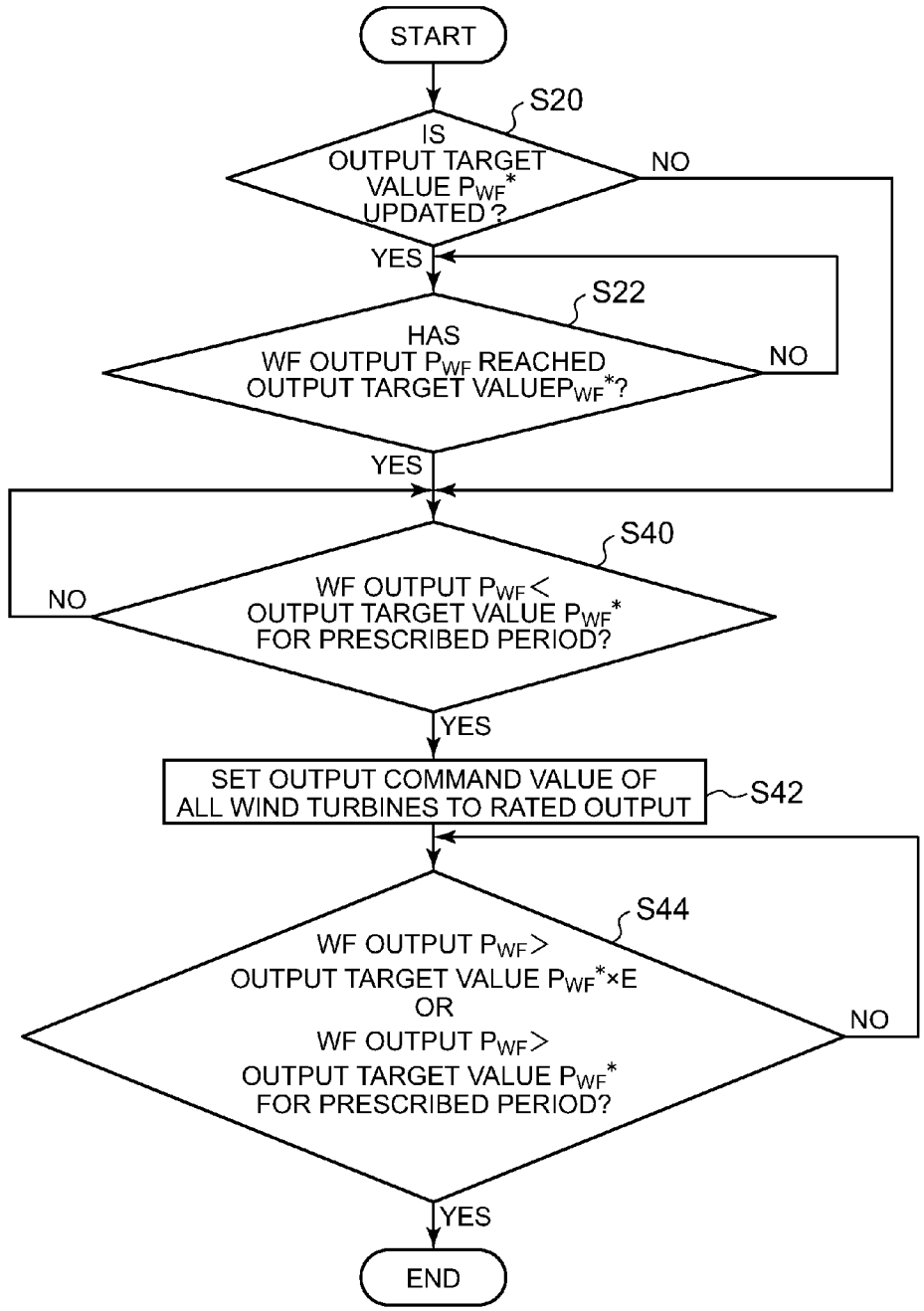
FIG. 7 is a flow chart illustrating a process of determining the correction amount of the output command value $Pout_i$ according to an embodiment.

Step S20 and step S22 in the illustrative embodiment shown in FIG. 7 are substantially the same as step S20 and step S22 of FIG. 6 and thus are not explained further.

If it is determined in step S20 that the output target value $P_{WF}^*$ is not updated (NO in step S20) or the WF output $P_{WF}$ has reached the updated value of the output target value $P_{WF}^*$ (YES in step S22), the process advances to step S40 to determine whether or not the state where the WF output $P_{WF}$ is below the output target value $P_{WF}^*$ has lasted for a prescribed period of time. If it is determined that the state where the WF output $P_{WF}$ is below the output target value $P_{WF}^*$ has lasted for the prescribed period of time, the process advances to step S42. In contrast, if it is determined that the state where the WF output $P_{WF}$ is below the output target value $P_{WF}*$ has not lasted for the prescribed period of time, the process repeats step S40.

In step S42, the output command value $Pout_i$ of all of the wind turbines $WTG_i$ is set to a rated power value. More specifically, in order to compensate for the sum of deficiency of the WF output $P_{WF}$ with respect to the output target value $P_{WF}*$, the output command value $Pout_i$ of each wind turbine calculated in the WTG output determination step (step S8 of FIG. 5) is corrected and the rated power value is supplied to each of the wind turbines $WTG_i$ as the corrected output command value $Pout_i$.

Next, the process advances to step S44 to determine whether or not the WF output $P_{WF}$ has exceeded the threshold value (=output target value $P_{WF}* \times E$; E>1) or whether or not the state where the state where the WF output $P_{WF}$ exceeds the output target value $P_{WF}*$ has lasted for a prescribed period of time. If it is determined YES in step S44, the WTG output correction step (S10 of FIG. 5) is ended. If it is determined NO in step S44, the process repeats step S44.

In this manner, the output command value $Pout_i$ is corrected based on the difference between the total output $P_{WF}$ and the output target value $P_{WF}*$.

Figure 8:
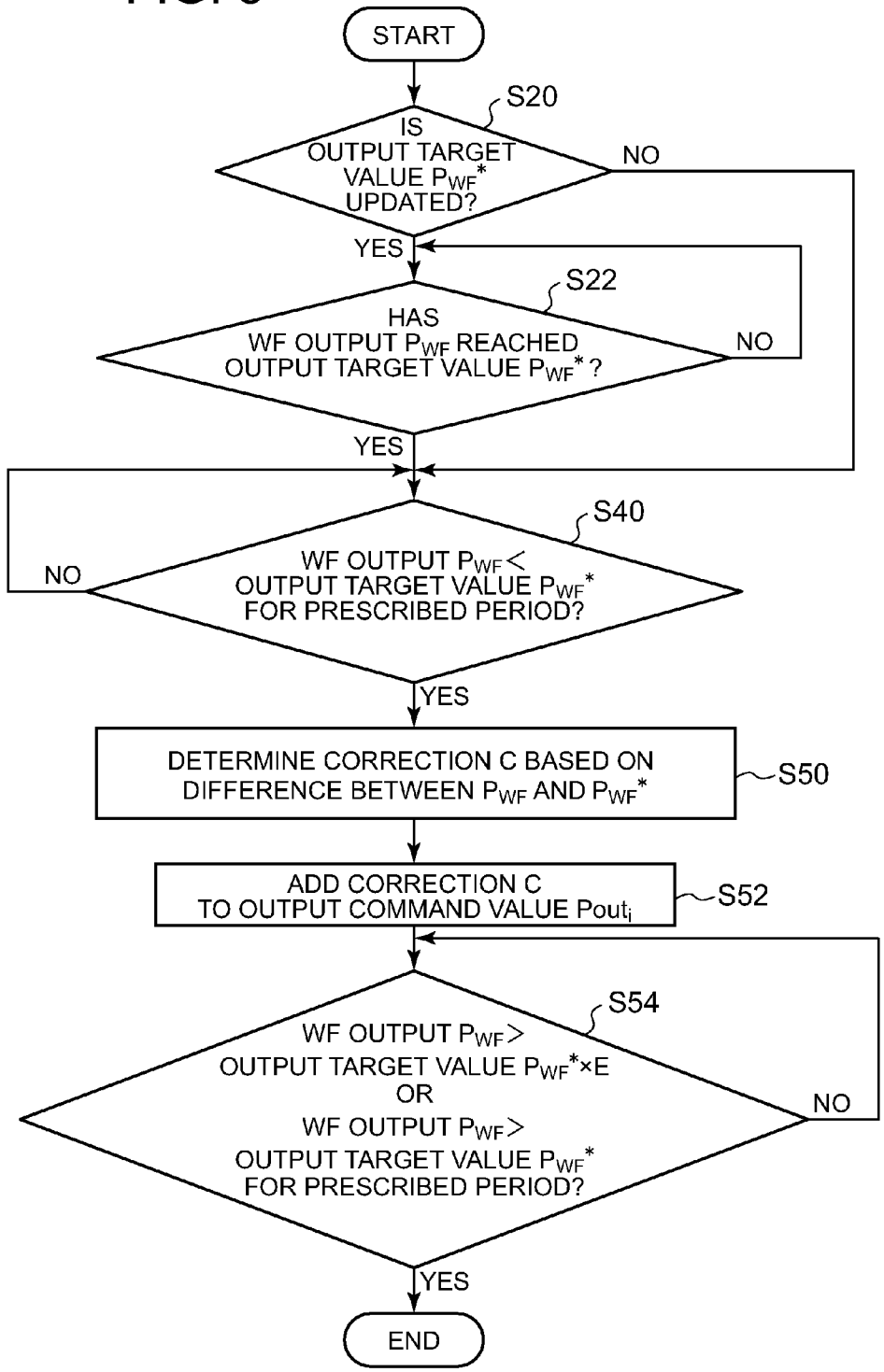
FIG. 8 is a flow chart illustrating a process of determining the correction amount of the output command value $Pout_i$ according to an embodiment.

Step S20 and step S22 in the illustrative embodiment shown in FIG. 8 are substantially the same as step S20 and step S22 of FIG. 6 and thus are not explained further. Further, step S40 in the illustrative embodiment shown in FIG. 8 is substantially the same as step S40 of FIG. 7. Thus, these steps are not explained further.

If it is determined in step S40 that the state where the WF output $P_{WF}$ is below the output target value $P_{WF}*$ has lasted for a prescribed period of time (YES in step S40), the correction C of the output command value $Pout_i$ is determined in step S50 based on the difference between the WF output $P_{WF}$ and the output target value $P_{WF}*$ (output deficiency). Then, in step S52, the correction C is added to the output command value $Pout_i$ calculated in the above-described WTG output determination step (step S8 in FIG. 5). Next, the process advances to step S54 to determine whether or not the state where the WF output $P_{WF}$ has exceeded the threshold value (=output target value $P_{WF}* \times E$; E>1), or whether or not the state where the state where the WF output $P_{WF}$ exceeds the threshold value has lasted for a prescribed period of time. If it is determined YES in step S54, the WTG output correction step (S10 of FIG. 5) is ended. If it is determined NO in step S54, the process repeats step S54.

In this manner, the output command value $Pout_i$ is corrected based on the difference between the total output $P_{WF}$ and the output target value $P_{WF}*$.

Figure 9:
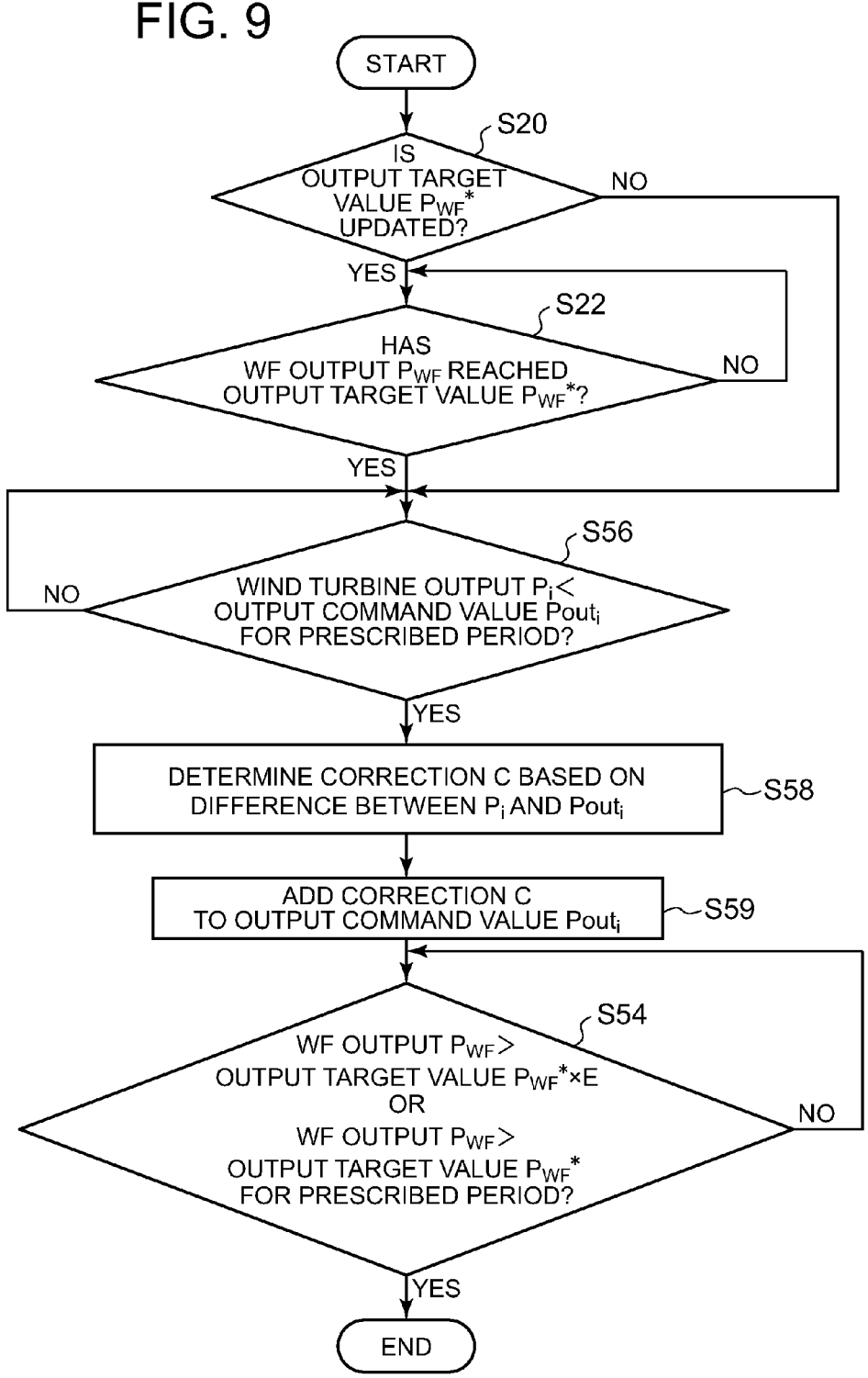
FIG. 9 is a flow chart illustrating a process of determining the correction amount of the output command value $Pout_i$ according to an embodiment.

Step S20 and step S22 in the illustrative embodiment shown in FIG. 9 are substantially the same as step S20 and step S22 of FIG. 6. Further, step S54 in the illustrative embodiment shown in FIG. 9 is substantially the same as step S54 of FIG. 8. Thus, these steps S20, S22 and S54 are not explained further.

If it is determined in step S20 that the output target value $P_{WF}*$ is not updated (NO in step S20) or the WF output $P_{WF}$ has reached the updated value of the output target value $P_{WF}*$ (YES in step S22), the process advances to step S56 to determine for each of the wind turbines $WTG_i$ whether or not the state where the current output $P_i$ is below the output command value $Pout_i$ has lasted for a prescribed period of time. If there is no wind turbine in which the state where the current output $P_i$ is below the output command value $Pout_i$ has lasted for the prescribed period of time (NO in step S56), the process repeats step S56. In contrast, if there is even one wind turbine in which the state where the current output $P_i$ is below the output command value $Pout_i$ has lasted for the prescribed period of time (YES in step S56), the process advances to step S58 to decide the correction amount C for those wind turbines in which the state where the current output $P_i$ is below the output command value $Pout_i$ has lasted for the prescribed period of time. In this process, the correction amount C is decided based on the difference between the current output $P_i$ and output command value $Pout_i$ (output deficiency). Next, in step S59, the correction C is added to the output command value $Pout_i$ calculated in the above-described WTG output determination step (step S8 in FIG. 5).

In this manner, the output command value $Pout_i$ is corrected based on the difference between the current output $P_i$ and output command value $Pout_i$ (output deficiency).

Figure 10:
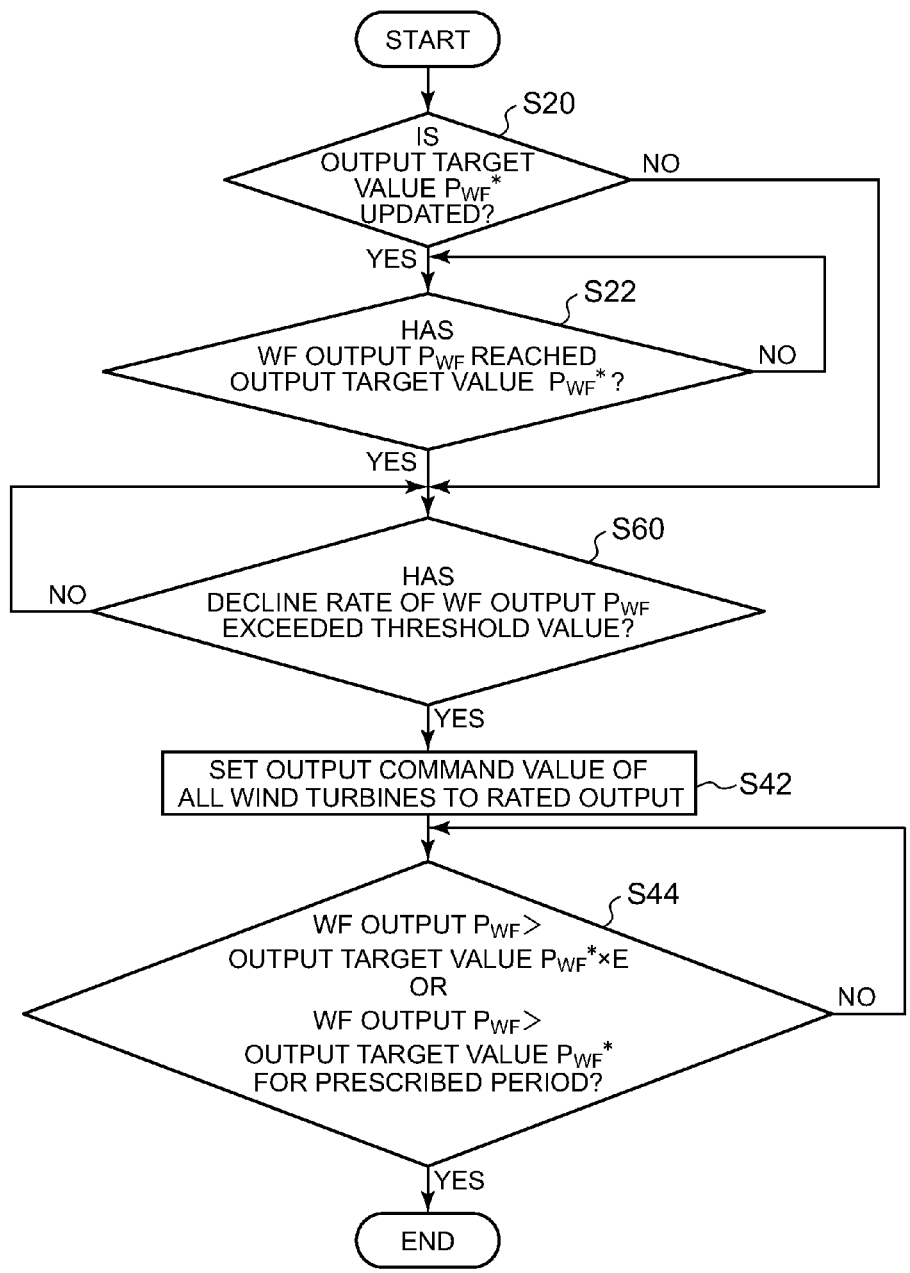
FIG. 10 is a flow chart illustrating a process of determining the correction amount of the output command value $Pout_i$ according to an embodiment.

Step S20 and step S22 in the illustrative embodiment shown in FIG. 10 are substantially the same as step S20 and step S22 of FIG. 6. Thus, these steps S20 and S22 are not explained further.

If it is determined in step S20 that the output target value $P_{WF}*$ is not updated (NO in step S20) or the WF output $P_{WF}$ has reached the updated value of the output target value $P_{WF}*$ (YES in step S22), the process advances to step S60 to determine whether or not a rate of decline of WF output $P_{WF}$ has exceeded a threshold value. When the rate of decline of WF output $P_{WF}$ has exceeded the threshold value, the process advances to step S42. In contrast, if the rate of decline of WF output $P_{WF}$ is not greater than the threshold value, the process repeats step S60.

In step S42, the output command value $Pout_i$ is set to a rated power value for all of the wind turbine generators $WTG_i$. More specifically, the output command value $Pout_i$ calculated in the WTG output determination step (Step S8 of FIG. 5) for each wind turbine is corrected and then, the rated power value is supplied to each of the wind turbines $WTG_i$ as the corrected output command value $Pout_i$. As a result, it is possible to compensate for the sum of deficiency of the WF output $P_{WF}$ with respect to the output target value $P_{WF}*$ up to the present point, and a future output deficiency which is expected based on a high rate of decline of the WF output $P_{WF}$.

Next, the process advances to step S44 to determine whether or not the WF output $P_{WF}$ has exceeded the threshold value (=output target value $P_{WF}* \times E$; E>1) or whether or not the state where the state where the WF output $P_{WF}$ exceeds the output target value $P_{WF}*$ has lasted for a prescribed period of time. If it is determined YES in step S44, the WTG output correction step (S10 of FIG. 5) is ended. If it is determined NO in step S44, the process repeats step S44.

In this manner, the output command value $Pout_i$ is corrected based on the change rate of WF output $P_{WF}$ (rate of decline).

Figure 11:
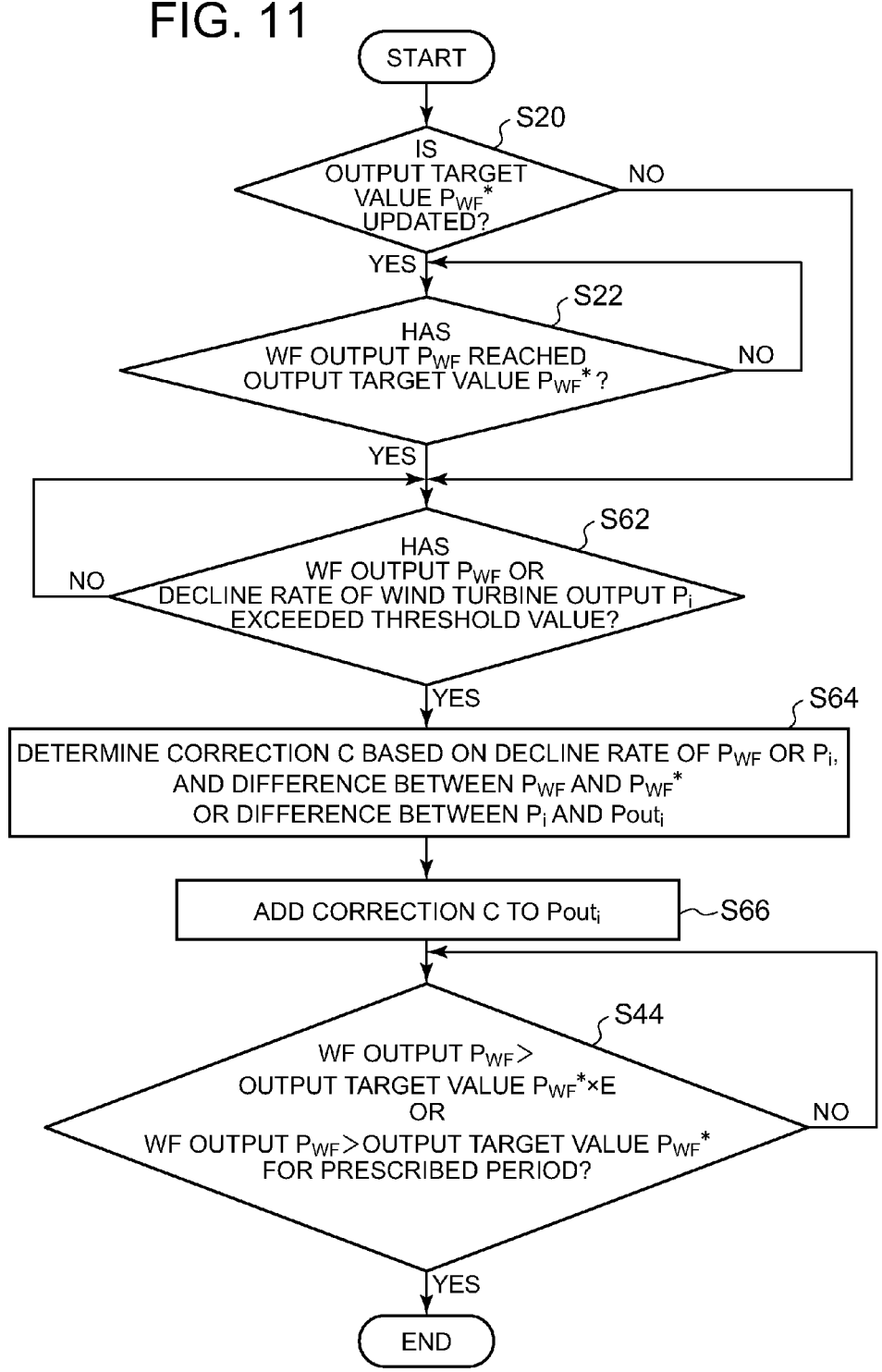
FIG. 11 is a flow chart illustrating a process of determining the correction amount of the output command value $Pout_i$ according to an embodiment.

Step S20 and step S22 in the illustrative embodiment shown in FIG. 11 are substantially the same as step S20 and step S22 of FIG. 6. Further, step S44 in the illustrative embodiment shown in FIG. 11 is substantially the same as step S44 of FIG. 7. Thus, these steps S20, S22 and S44 are not explained further.

If it is determined in step S20 that the output target value $P_{WF}*$ is not updated (NO in step S20) or the WF output $P_{WF}$ has reached the updated value of the output target value $P_{WF}*$ (YES in step S22), the process advances to step S62 to determine whether or not the rate of decline of WF output $P_{WF}$ or the current output $P_i$ of some of the wind turbine $WTG_i$ has exceeded a threshold value. When the rate of decline of WF output $P_{WF}$ or the current output $P_i$ of some of the wind turbine $WTG_i$ has exceeded the threshold value, the process advances to step S64. In contrast, if the rate of decline of WF output $P_{WF}$ or the current output $P_i$ of all of the wind turbines $WTG_i$ is not greater than the threshold value, the process repeats step S62.

In step S64, the correction C is determined based on the rate of decline of the WF output $P_{WF}$ or the current output $P_i$ of the wind turbines $WTG_i$, the difference between the WF output $P_{WF}$ and the output target value $P_{WF}*$, or the difference between current output $P_i$ and the output command value $Pout_i$. Next, in step S66, the correction C is added to the output command value $Pout_i$ calculated in the above-described WTG output determination step (step S8 in FIG. 5).

In this manner, the output command value $Pout_i$ is corrected based on the rate of decline of the WF output $P_{WF}$ or the current output $P_i$ of the wind turbine, the difference between the WF output $P_{WF}$ and the output target value $P_{WF}*$, or the difference between current output $P_i$ and the output command value $Pout_i$.

In other embodiments, step S62 of determining whether or not the rate of decline of WF output $P_{WF}$ or the current output $P_i$ of some of the wind turbine $WTG_i$ has exceeded a threshold value may be skipped. In this embodiment, if it is determined in step S20 that the output target value $P_{WF}*$ is not updated (NO in step S20) or the WF output $P_{WF}$ has reached the updated value of the output target value $P_{WF}*$ (YES in step S22), the process advances directly to step S64 to determine the correction amount C.

Figure 12:
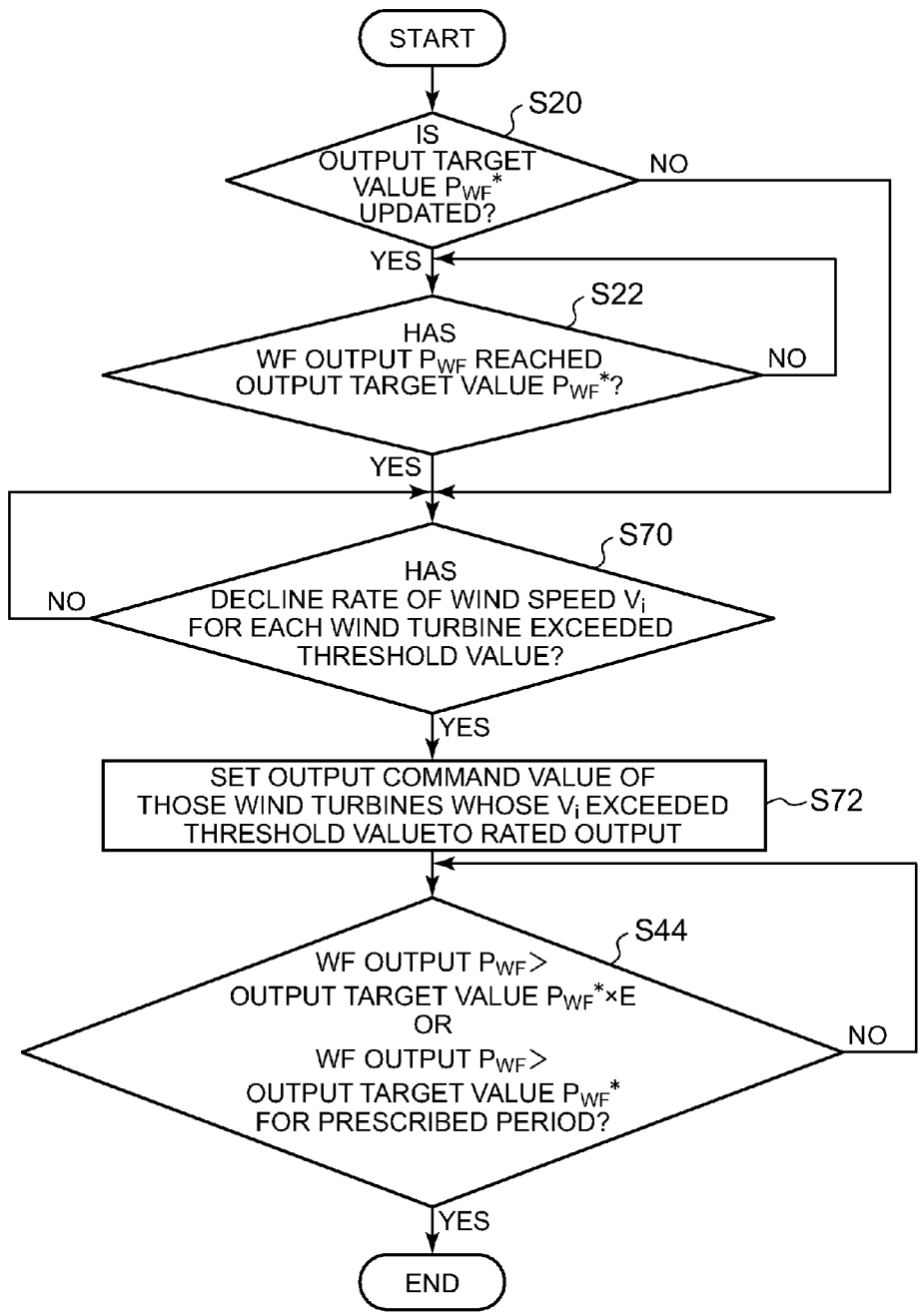
FIG. 12 is a flow chart illustrating a process of determining the correction amount of the output command value $Pout_i$ according to an embodiment.

Step S20 and step S22 in the illustrative embodiment shown in FIG. 12 are substantially the same as step S20 and step S22 of FIG. 6. Further, step S44 in the illustrative embodiment shown in FIG. 12 is substantially the same as step S44 of FIG. 7. Thus, these steps S20, S22 and S44 are not explained further.

If it is determined in step S20 that the output target value $P_{WF}*$ is not updated (NO in step S20) or the WF output $P_{WF}$ has reached the updated value of the output target value $P_{WF}*$ (YES in step S22), the process advances to step S70 to determine whether or not a rate of decline of the wind speed $V_i$, for some of the wind turbine $WTG_i$ has exceeded a threshold value.

When the rate of decline of the wind speed $V_i$ for some of the wind turbine $WTG_i$ has exceeded the threshold value (YES in step S70), the process advances to step S72. In contrast, if the rate of decline of the wind speed $V_i$ for some of the wind turbine $WTG_i$ is not greater than the threshold value (NO in step S70), the process repeats step S70.

In step S72, the output command value $Pout_i$ is set to a rated power value for those wind turbine generators $WTG_i$ whose wind speed decline rate has exceeded the threshold value. More specifically, in order to compensate beforehand for the efficiency of the WF output $P_{WF}$ with respect to the output target value $P_{WF}*$which is expected to take place in response to wind speed reduction of a part of the wind turbines, the output command value $Pout_i$ of the those wind turbines $WTG_i$ whose rate of decline of the wind speed $V_i$ has exceeded the threshold value is corrected and then, the rated power value is set as the corrected output command value $Pout_i$.

In this manner, the output command value $Pout_i$ is corrected based on the change rate (decline rate) of the wind speed $V_i$ for each of the wind turbine $WTG_i$.

Figure 13:
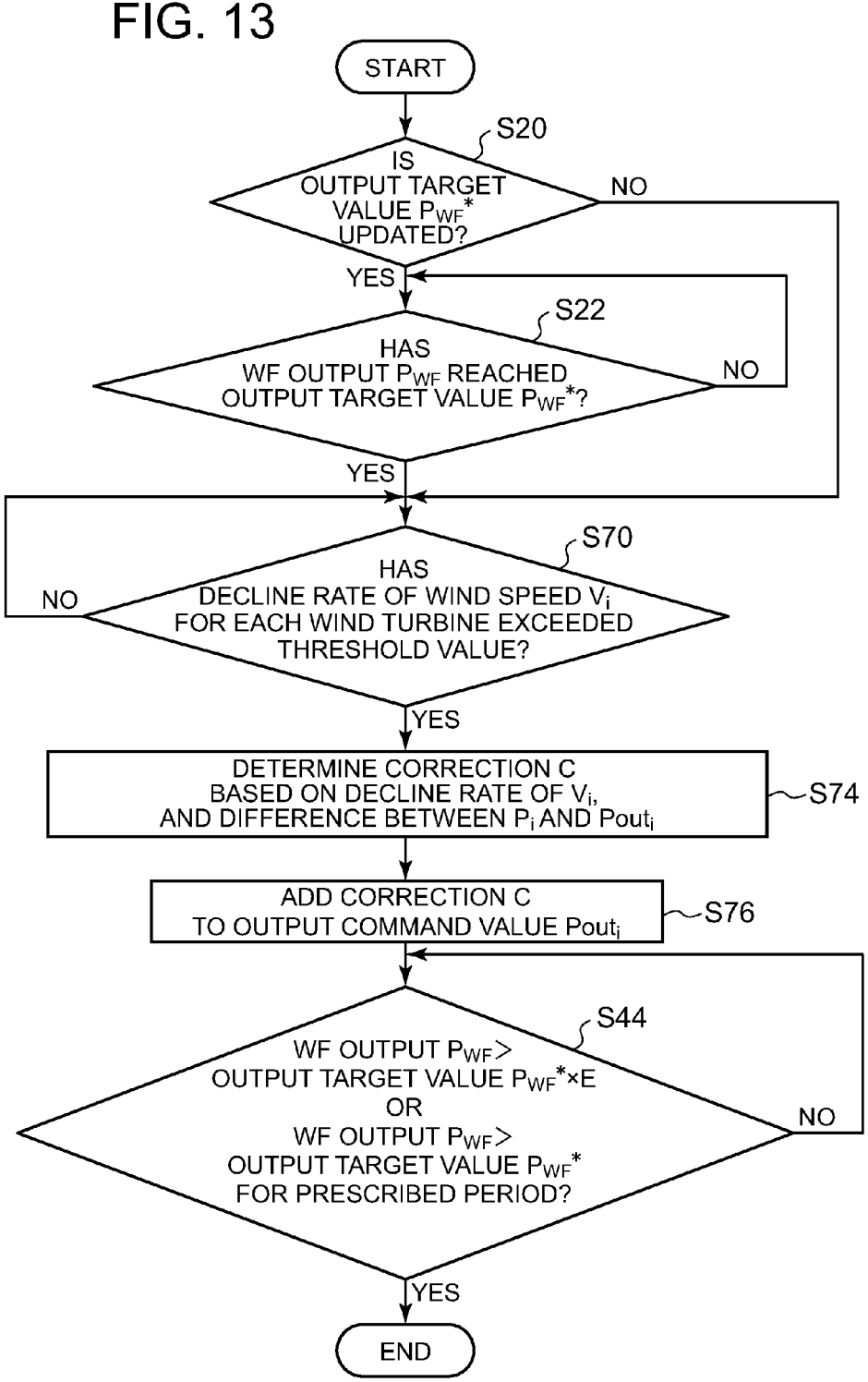
FIG. 13 is a flow chart illustrating a process of determining the correction amount of the output command value $Pout_i$ according to an embodiment.

Step S20 and step S22 in the illustrative embodiment shown in FIG. 13 are substantially the same as step S20 and step S22 of FIG. 6. Further, step S70 in the illustrative embodiment shown in FIG. 13 is substantially the same as step S72 of FIG. 12. Further, step S44 in the illustrative embodiment shown in FIG. 13 is substantially the same as step S44 of FIG. 7. Thus, these steps S20, S22, S72 and S44 are not explained further.

If it is determined in step S70 that the decline rate of the wind speed $V_i$ for some of the wind turbine generators $WTG_i$ has exceeded the threshold value (determined as YES), the process advances to step S74 to determine the correction amount C based on the decline rate of the wind speed $V_i$ and the difference between the current output $P_i$ and the output command value $Pout_i$ for those wind turbines $WTG_i$ whose decline rate of the wind speed has exceeded the threshold value. Then, in step S76, the correction amount C is added to the output command value $Pout_i$ calculated in the WTG output determination step (Step S8 of FIG. 5).

In this manner, the output command value $Pout_i$ is corrected based on the change rate (decline rate) of the wind speed $V_i$ for each of the wind turbine $WTG_i$ and the difference between the current output $P_i$ and the output command value $Pout_i$.

In other embodiments, step S70 of determining whether or not the decline rate (decline speed) of the wind speed $V_i$ for each of the wind turbine $WTG_i$ has exceeded a threshold value may be skipped. In this embodiment, if it is determined in step S20 that the output target value $P_{WF}*$ is not updated (NO in step S20) or the WF output $P_{WF}$ has reached the updated value of the output target value $P_{WF}*$(YES in step S22), the process advances directly to step S74. Then, in step S74, for each of the wind turbine $WTG_i$, the correction amount C is determined based on the decline rate of the wind speed $V_i$ and the difference between the current output $P_i$ and the output command value $Pout_i$.

In some embodiments, as illustrated in FIG. 5, the output control method for the wind farm further includes an output change rate limit step (step S12) of limiting the change rate of the WF output $P_{WF}$.

In the output change rate limit step (Step S12), in the transient period from the point when the output target value $P_{WF}*$ is updated to the point when the WF output $P_{WF}$ reaches the updated value of the output target value $P_{WF}*$, the change rate of the WF output $P_{WF}$ is limited to the first change rate. In contrast, in the period excluding the transient period, the change rate of the WF output $P_{WF}$ is limited to the second change rate, which is higher than the first change rate.

As described above, by limiting the change rate of the WF output $P_{WF}$ to the first change rate, which is comparatively a small rate, in the transient period from the point when the output target value $P_{WF}*$ is updated to the point when the WF output $P_{WF}$ reaches the updated value of the output target value $P_{WF}*$, the output control by the ramp rate requested by the grid 2 is made easy. Further, by limiting the change rate of the WF output $P_{WF}$ to the second change rate, which is comparatively a high rate, in the period excluding the transient period, the output control of the wind farm can promptly follow changes in the wind speed and it is possible to mitigate inequality between the WF output $P_{WF}$ and the output target value $P_{WF}*$ which results from wind speed decrease.

As described above, according to the above-described embodiments, when the output target value $P_{WF}*$ is greater than the WF output $P_{WF}$, the output increase amount $s_i$ is assigned to each wind turbine $WTG_i$ based on the potential output $Ppot_i$ of each wind turbine $WTG_i$. Therefore, it is possible to mitigate inequality between the WF output $P_{WF}$ and the output target value $P_{WF}*$ which results from wind speed decrease. More specifically, it is possible to reduce effects that the wind speed decrease of some wind turbine $WTG_i$ has on the total output $P_{WF}$ of the wind farm 1 by taking into account the potential output $Ppot_i$, which is excess of the extractable output $Pmax_i$ with respect to the current output $P_i$, when assigning the output increase amount $s_i$ to each wind turbine $WTG_i$.

While the embodiments of the present invention have been described, it is obvious to those skilled in the art that various changes and modifications may be made without departing from the scope of the invention. For instance, some of the above-described embodiments may be combined arbitrarily.

[Simulation Result]

The simulation was conducted under the condition that the output target value $P_{WF}^*$ of the wind farm is updated and the wind speed V for each of the wind turbines $WTG_i$ changes equally, and a change in the WF output $P_{WF}$ with application of the WF output control method according to the above embodiments is evaluated.

More specifically, as the simulation condition, the WTG output correction step (step S10) is performed for correcting the output command value $Pout_i$ so that the sum of differences between the WF output $P_{WF}$ and the output target value $P_{WF}^*$ is at least partially compensated. Further, the output change rate limit step (Step S12) is performed for limiting the change rate of $P_{WF}$ to the first change rate in the transient period from the point when the output target value $P_{WF}^*$ is updated to the point when the WF output $P_{WF}$ reaches the updated value of the output target value $P_{WF}^*$ and limiting the change rate of the WF output $P_{WF}$ to the second change rate in the period excluding the transient period.

Figure 14:
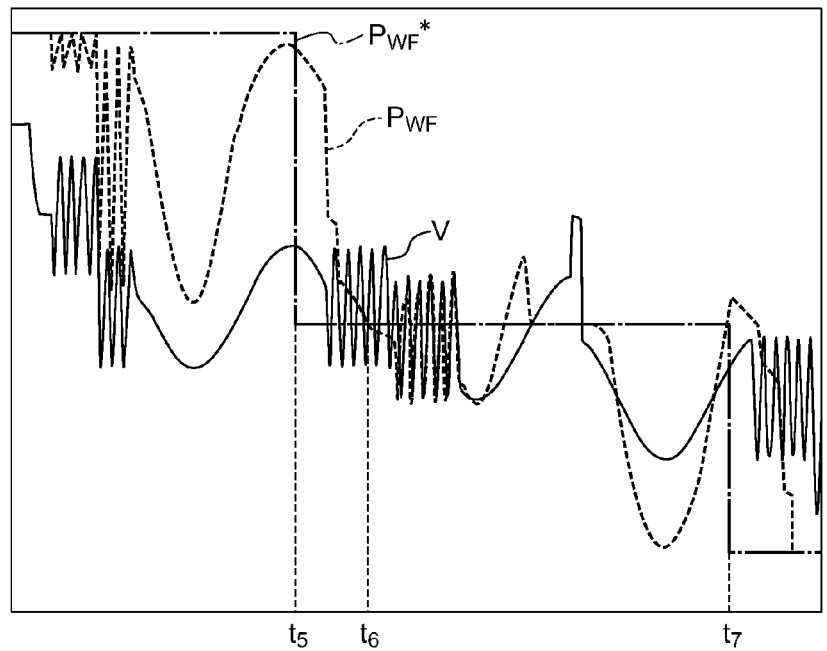
FIG. 14 is a graph of simulation results illustrating changes in the WF output when the WF output control is performed according to an embodiment.

The simulation result of this case regarding the WF output $P_{WF}$ is illustrated in FIG. 14.

Another simulation was conducted as a comparison example, under the condition that neither the WTG output correction step (step S10) or the output change rate limit step (step S12) is performed.

Figure 15:
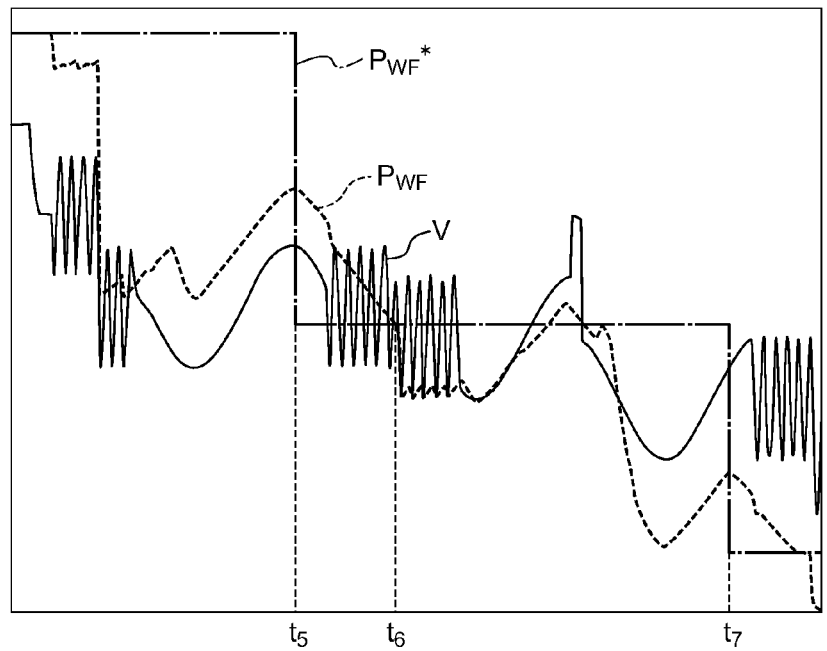
FIG. 15 is a graph of simulation results illustrating changes in the WF output when the WF output control is performed according to a comparison example.

The simulation result of this case regarding the WF output $P_{WF}$ is illustrated in FIG. 15.

As obvious from comparing the simulation results illustrated in FIG. 14 and FIG. 15, the simulation result illustrated in FIG. 14 shows that the WF output $P_{WF}$ declines in response to decline of the wind speed V and then exceeds the output target value $P_{WF}^*$ to promptly follow recovery of the wind speed V and immediately after this, the deficiency of the WF output $P_{WF}$ with respect to the output target value $P_{WF}^*$ is compensated. This is more obvious in a period from time $t_6$ when the WF output $P_{WF}$ reaches the updated value of the output target value $P_{WF}^*$ to time $t_7$ when the output target value $P_{WF}^*$ is updated next time. More specifically, in the period excluding the transient period from the point (time $t_3$) when the output target value $P_{WF}^*$ is updated to the point (time $t_6$) when the WF output $P_{WF}$ reaches the updated output target value $P_{WF}^*$, a phenomenon was observed where the deficiency of the WF output $P_{WF}$ with respect to the output target value $P_{WF}^*$ which results from decline of the wind speed V, is compensated. The first reason of this phenomenon is that the output command value $Pout_i$ is corrected so that the sum of differences between the WF output $P_{WF}$ and the output target value $P_{WF}^*$ is at least partially compensated. The second reason of the phenomenon is that, in the period excluding the transient period $(t_5-t_6)$ from the point when the output target value $P_{WF}^*$ is updated to the point when the WF output $P_{WF}$ reaches the updated output target value $P_{WF}^*$, the change rate of the WF output $P_{WF}$ is limited to the second change rate, which is higher than the output change rate (the first change rate) in the transient period $(t_5-t_6)$ and this makes the effect of the correction of the output command value $Pout_i$ more obvious.

Further, the simulation result illustrated in FIG. 14 shows suppression of changes in the WF output $P_{WF}$ in the transient period from the point (time $t_3$) when the output target value $P_{WF}^*$ is updated to the point (time $t_6$) when the WF output $P_{WF}$ reaches the updated value of the output target value $P_{WF}^*$. More specifically, the WF output $P_{WF}$ changes significantly to promptly follow change in the wind speed in the period (before $t_5$, and $t_6-t_7$) excluding the transient period, whereas the WF output $P_{WF}$ changes slightly and decreases at an almost constant ramp rate in the transient period $(t_5-t_6)$ excluding the transient period. This is achieved by limiting the change rate of the WF output $P_{WF}$ to the first change rate in the transient period from the point when the output target value $P_{WF}^*$ is updated to the point when the WF output $P_{WF}$ reaches the updated value of the output target value $P_{WF}^*$ and limiting the change rate of the WF output $P_{WF}$ to the second change rate, which is higher than the first change rate, in the period excluding the transient period.

REFERENCE SIGNS LIST

1 Wind Farm
2 Grid
10 WF output control device
11 WTG output obtaining unit
12 Extractable output calculation unit
14 Potential output calculation unit
16 WTG output determination unit
18 WTG output correction unit
19 Output change rate controller

The invention claimed is:

1. An output control device for a wind farm which includes n number, of wind turbines, n being an integer of two or more, the output control device comprising:
 a WTG output obtaining unit for obtaining a current output $P_i$ of each of the wind turbines where i=1, . . . , n;
 an extractable output calculation unit for calculating an extractable output $Pmax_i$ for each of the wind turbines where i=1, . . . , n, the extractable output $Pmax_i$ being energy extractable from wind energy;
 a potential output calculation unit for calculating a potential output $Ppot_i$ of each of the wind turbines based on a difference between the extractable output $Pmax_i$ and the current output $P_i$ of each of the wind turbines where i=1, . . . , n; and
 a WTG output determination unit for determining an output command value of each of the wind turbines so that a total output $P_{WF}$ of the wind farm becomes closer to an output target value $P_{WF}^*$,
 wherein the WTG output determination unit is configured to
  assign an output increase amount to each of the wind turbines based on the potential output $Ppot_i$ of each of the wind turbines and to determine the output command value based on the output increase amount, when the output target value $P_{WF}^*$ of the wind farm is greater than the total output $P_{WF}$ of the wind farm, and
  assign the output increase amount only to the wind turbines in which a rotor rotation speed has reached a rated rotation speed.

2. An output control device for a wind farm which includes n number of wind turbines, n being an integer of two or more, the output control device comprising:
- a WTG output obtaining unit for obtaining a current output $P_i$ of each of the wind turbines where
- an extractable output calculation unit for calculating an extractable output $Pmax_i$ for each of the wind turbines where i=1, . . . , n, the extractable output $Pmax_i$ being energy extractable from wind energy;
- a potential output calculation unit for calculating a potential output $Ppot_i$ of each of the wind turbines based on a difference between the extractable output $Pmax_i$ and the current output $P_i$ of each of the wind turbines where i=1, . . . , n; and
- a WTG output determination unit for determining an output command value of each of the wind turbines so that a total output $P_{WF}$ of the wind farm becomes closer to an output target value $P_{WF}^*$,
- wherein the WTG output determination unit is configured to
  - assign an output increase amount to each of the wind turbines based on the potential output $Ppot_i$ of each of the wind turbines and to determine the output command value based on the output increase amount, when the output target value $P_{WF}^*$ of the wind farm is greater than the total output $P_{WF}$ of the wind farm, and
  - assign the output increase amount only to the wind turbines in which the potential output $Ppot_i$ is greater than a threshold value $Ppot_{th}$ where $Ppot_{th}>0$.

3. The output control device for the wind farm according to claim 1,
wherein the WTG output determination unit is configured to obtain the output command value for each of the wind turbines so that the output increase amount of each of the wind turbines is proportional to an amount of the potential output $Ppot_i$.

4. The output control device for the wind farm according to claim 1, further comprising:
a WTG output correction unit for correcting the output command value so that a sum of differences between the total output $P_{WF}$ and the output target value $P_{WF}^*$ is at least partially compensated.

5. The output control device for the wind farm according to claim 4,
wherein the WTG output correction unit is configured to correct the output command value only in a period excluding a transient period from a point when the output target value $P_{WF}^*$ is updated to a point when the total output $P_{WF}$ reaches an updated value of the output target value $P_{WF}^*$.

6. The output control device for the wind farm according to claim 4,
wherein the WTG output correction unit is configured to correct the output command value based on at least one of: the difference between the total output $P_{WF}$ and the output target value $P_{WF}^*$; a change rate of the total output $P_{WF}$ of the wind farm; a change rate of the current output $P_i$ of each of the wind turbines where i=1, . . . , n; a difference between the current output $P_i$ of each of the wind turbines and a current output command value $Pout_i$; and a change rate of a wind speed for each of the wind turbines.

7. The output control device for the wind farm according to claim 1, further comprising:
an output change rate controller for controlling an output change rate of the total output $P_{WF}$ of the wind farm,
wherein the output change rate controller is configured to:
limit a change rate of the total output $P_{WF}$ of the wind farm to a first change rate in a transient period from a point when the output target value $P_{WF}^*$ is updated to a point when the total output $P_{WF}$ reaches an updated value of the output target value $P_{WF}^*$; and
limit the change rate of the total output $P_{WF}$ of the wind farm to a second change rate in a period excluding the transient period, the second change rate being greater than the first change rate.

8. The output control device for the wind farm according to claim 2, further comprising:
an output change rate controller for controlling an output change rate of the total output $P_{WF}$ of the wind farm,
wherein the output change rate controller is configured to:
limit a change rate of the total output $P_{WF}$ of the wind farm to a first change rate in a transient period from a point when the output target value $P_{WF}^*$ is updated to a point when the total output $P_{WF}$ reaches an updated value of the output target value $P_{WF}^*$; and
limit the change rate of the total output $P_{WF}$ of the wind farm to a second change rate in a period excluding the transient period, the second change rate being greater than the first change rate.

9. An output control method for a wind farm which includes n number of wind turbines, n being an integer of two or more, the output control method comprising the steps of:
obtaining a current output $P_i$ of each of the wind turbines, where i=1, . . . , n;
calculating an extractable output $Pmax_i$ for each of the wind turbines where i=1, . . . , n, the extractable output $Pmax_i$ being extractable energy from wind energy;
calculating a potential output $Ppot_i$ of each of the wind turbines based on a difference between the extractable output $Pmax_i$ and the current output $P_i$ of each of the wind turbines where i=1, . . . , n; and
determining an output command value of each of the wind turbines so that a total output $P_{WF}$ of the wind farm becomes closer to an output target value $P_{WF}^*$,
wherein, in the step of determining the output command value,
when the output target value $P_{WF}^*$ of the wind farm is greater than the total output $P_{WF}$ of the wind farm, an output increase amount is assigned to each of the wind turbines based on the potential output $Ppot_i$ of each of the wind turbines and the output command value is determined based on the output increase amount, and
the WTG output determination unit assigns the output increase amount only to the wind turbines in which a rotor rotation speed has reached a rated rotation speed.

* * * * *